United States Patent
Ishihara et al.

(10) Patent No.: US 8,059,233 B2
(45) Date of Patent: Nov. 15, 2011

(54) LIQUID CRYSTAL DISPLAY DEVICE

(75) Inventors: Katsuyoshi Ishihara, Mobara (JP); Hironobu Yamada, Mobara (JP)

(73) Assignee: Hitachi Displays, Ltd., Chiba-ken (JP)

( * ) Notice: Subject to any disclaimer, the term of this patent is extended or adjusted under 35 U.S.C. 154(b) by 1030 days.

(21) Appl. No.: 11/354,891

(22) Filed: Feb. 16, 2006

(65) Prior Publication Data

US 2006/0221027 A1    Oct. 5, 2006

(30) Foreign Application Priority Data

Mar. 11, 2005 (JP) ................. 2005-068337

(51) Int. Cl.
*G02F 1/1335* (2006.01)

(52) U.S. Cl. ........ 349/106; 349/110; 349/107; 349/108; 349/109; 349/114

(58) Field of Classification Search ............ 349/113, 349/114, 106–109, 110–111, 129, 145, 146
See application file for complete search history.

(56) References Cited

U.S. PATENT DOCUMENTS

| | | | |
|---|---|---|---|
| 5,781,262 A * | 7/1998 | Suzuki et al. ............. | 349/128 |
| 6,067,140 A * | 5/2000 | Woo et al. ................ | 349/129 |
| 6,271,902 B1 * | 8/2001 | Ogura et al. .............. | 349/106 |
| 6,552,764 B2 * | 4/2003 | Fujioka et al. ........... | 349/106 |
| 6,654,076 B2 | 11/2003 | Ha et al. | |
| 7,180,567 B2 * | 2/2007 | Ikeda et al. .............. | 349/155 |
| 7,298,439 B2 * | 11/2007 | Ozawa et al. ............. | 349/114 |
| 7,474,483 B2 * | 1/2009 | Cheng et al. ............. | 359/891 |
| 2002/0093609 A1 * | 7/2002 | Baek et al. ............... | 349/113 |
| 2003/0160915 A1 * | 8/2003 | Liu ........................... | 349/106 |
| 2004/0017524 A1 * | 1/2004 | Li ............................ | 349/106 |
| 2004/0075788 A1 * | 4/2004 | Cheng ...................... | 349/106 |
| 2004/0169793 A1 * | 9/2004 | Ino et al. .................. | 349/106 |
| 2005/0007522 A1 * | 1/2005 | Hiraga et al. ............. | 349/106 |
| 2005/0225700 A1 * | 10/2005 | Takizawa ................. | 349/106 |
| 2006/0050211 A1 * | 3/2006 | Kim et al. ................ | 349/114 |
| 2006/0164576 A1 * | 7/2006 | Aoki ........................ | 349/114 |

* cited by examiner

*Primary Examiner* — Thanh-Nhan Nguyen
(74) *Attorney, Agent, or Firm* — Stites & Harbison PLLC; Juan Carlos A. Marquez, Esq.

(57) ABSTRACT

There is disclosed a transflective liquid crystal display having pixels each including a reflective region and a transmissive region. The aperture ratio of the pixels can be enhanced. End portions of two adjacent color filters are overlapped to form an optically shielding portion for each pixel. The optically shielding portion and the reflective region cooperate to form an optically shielding film acting as a black matrix for the transmissive region. The aperture ratio is enhanced by improving the positional relationship between the reflective regions and the color filters.

9 Claims, 36 Drawing Sheets

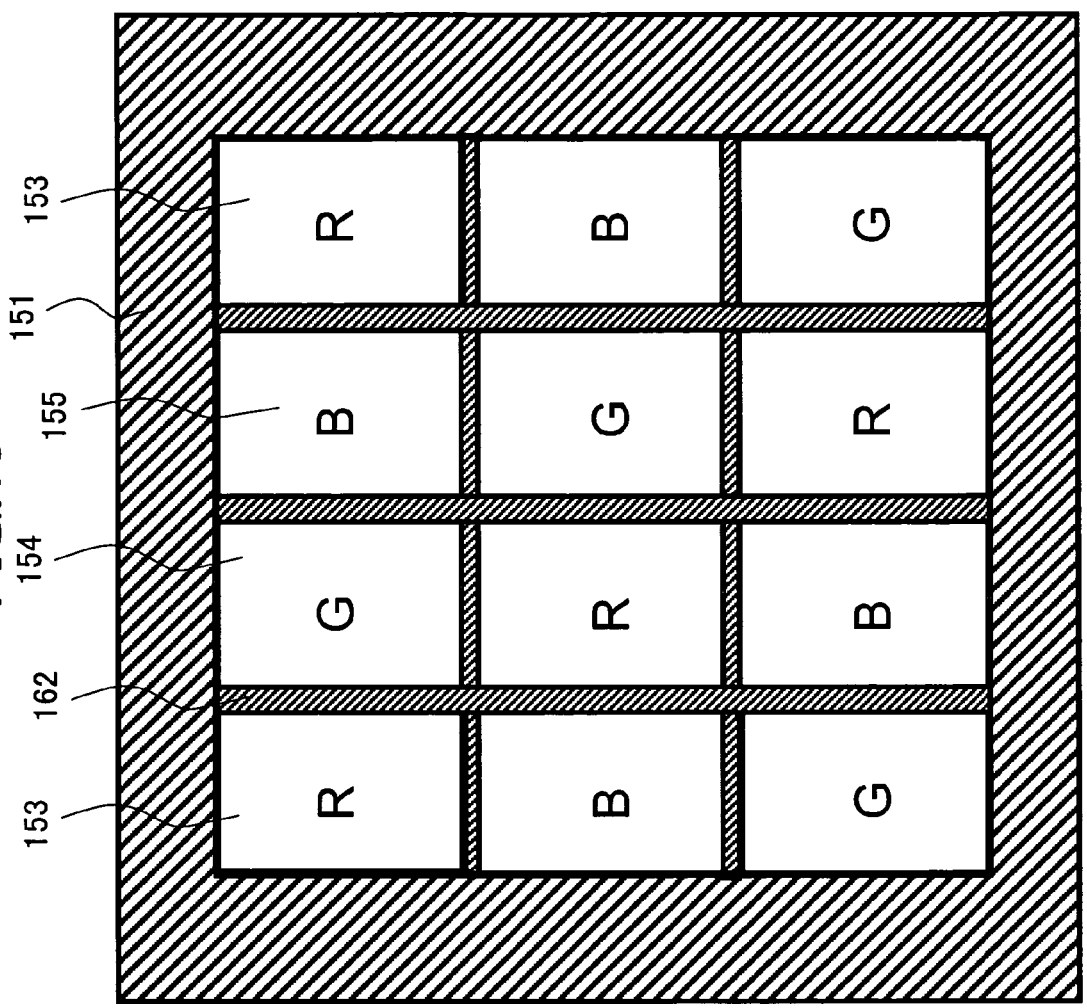

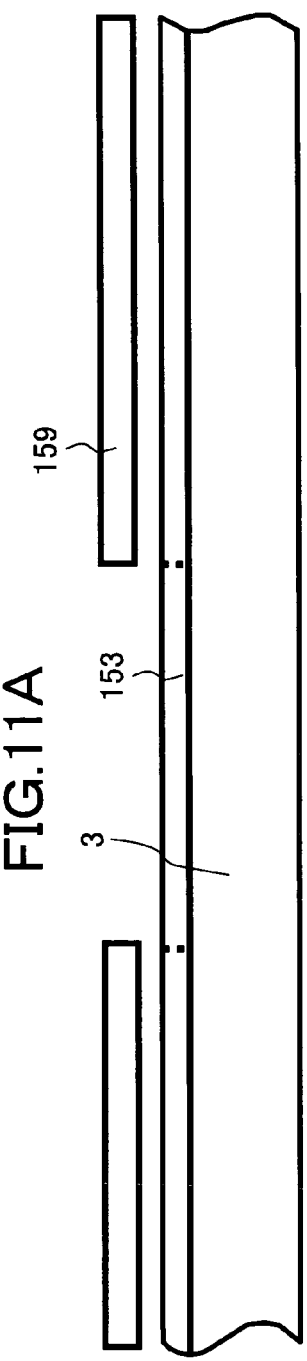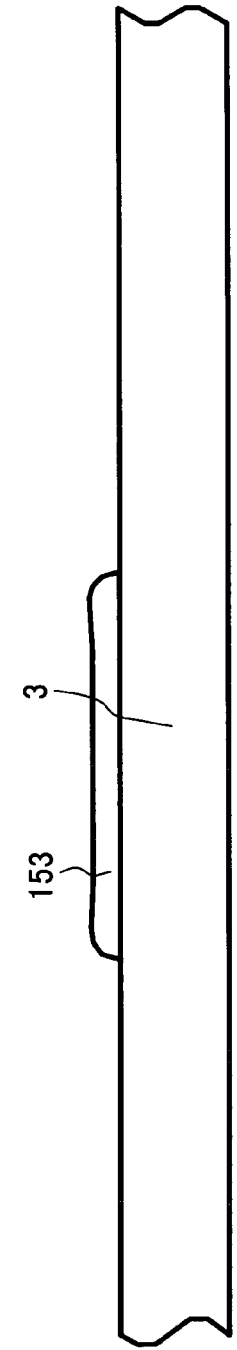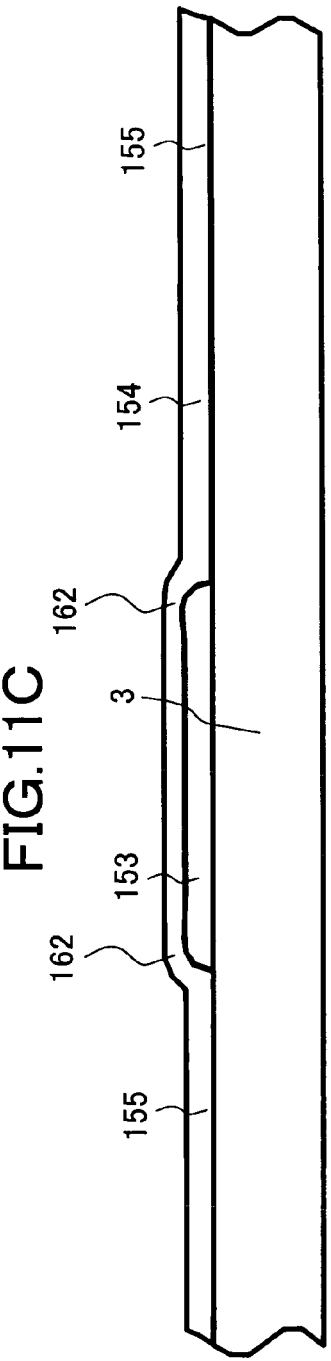

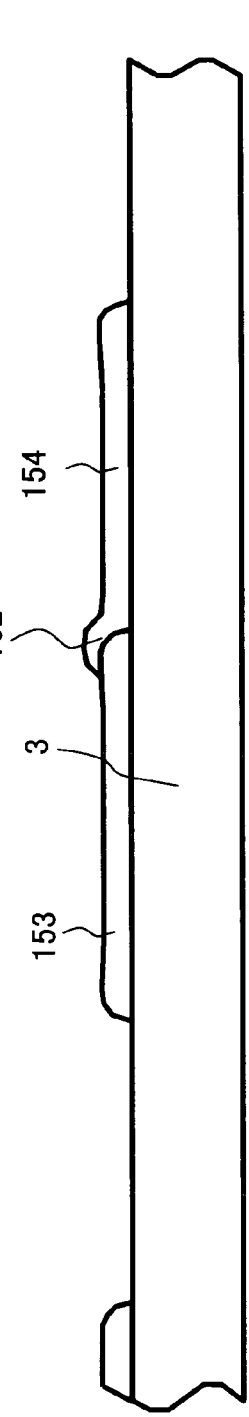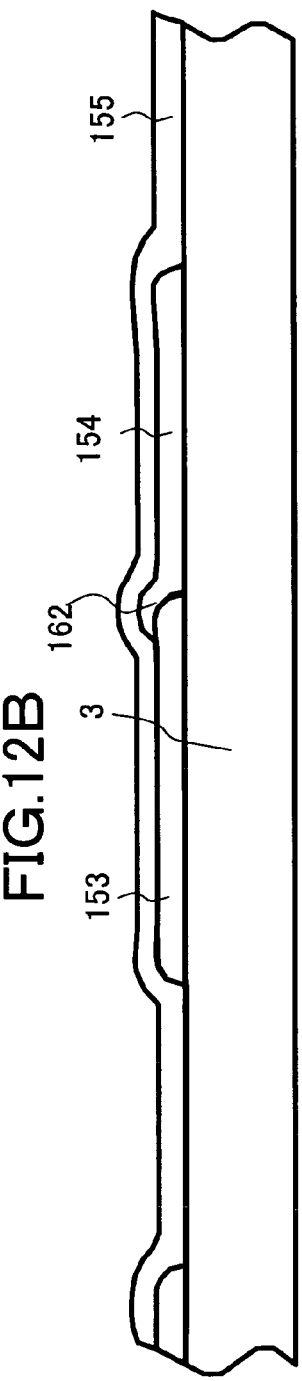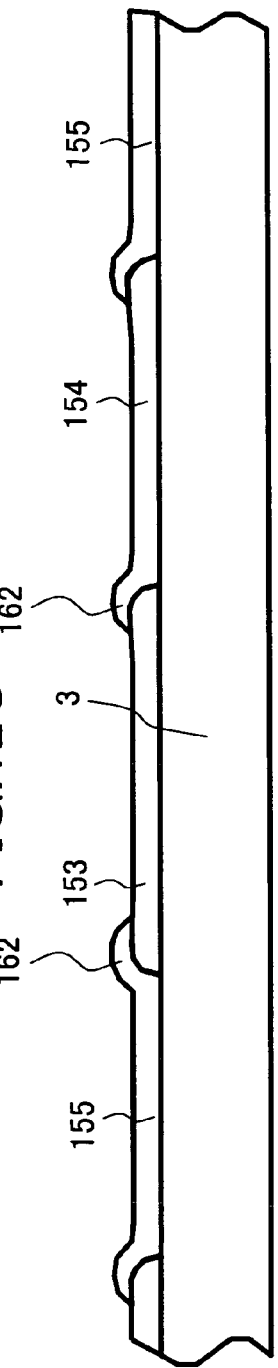

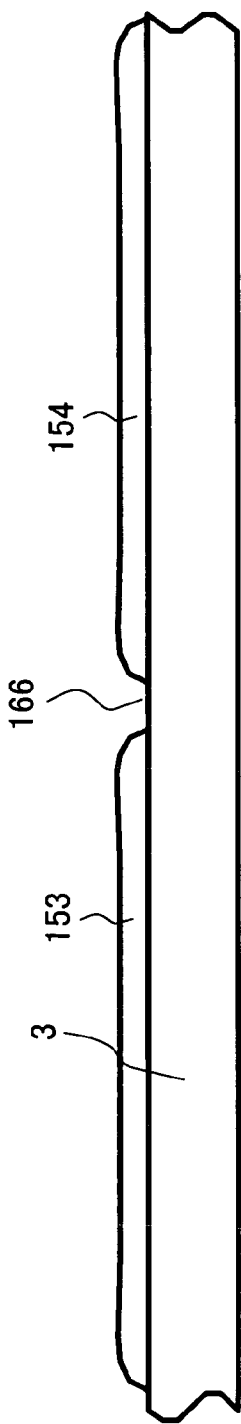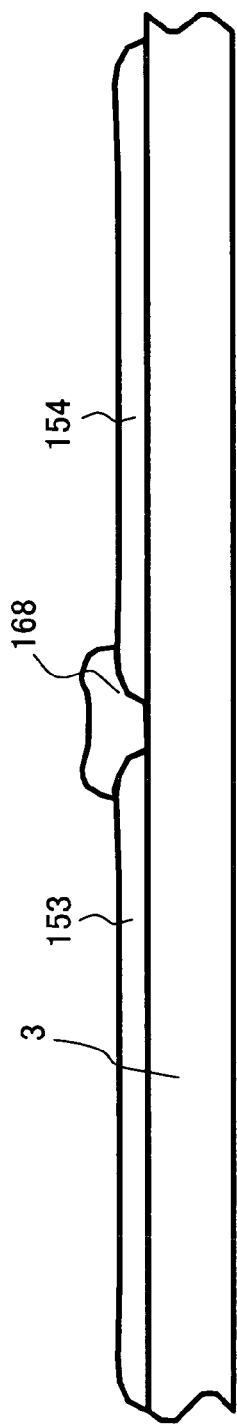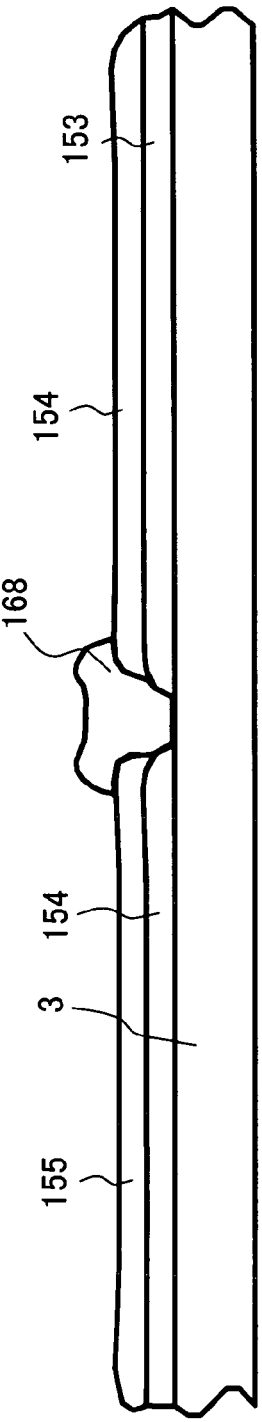

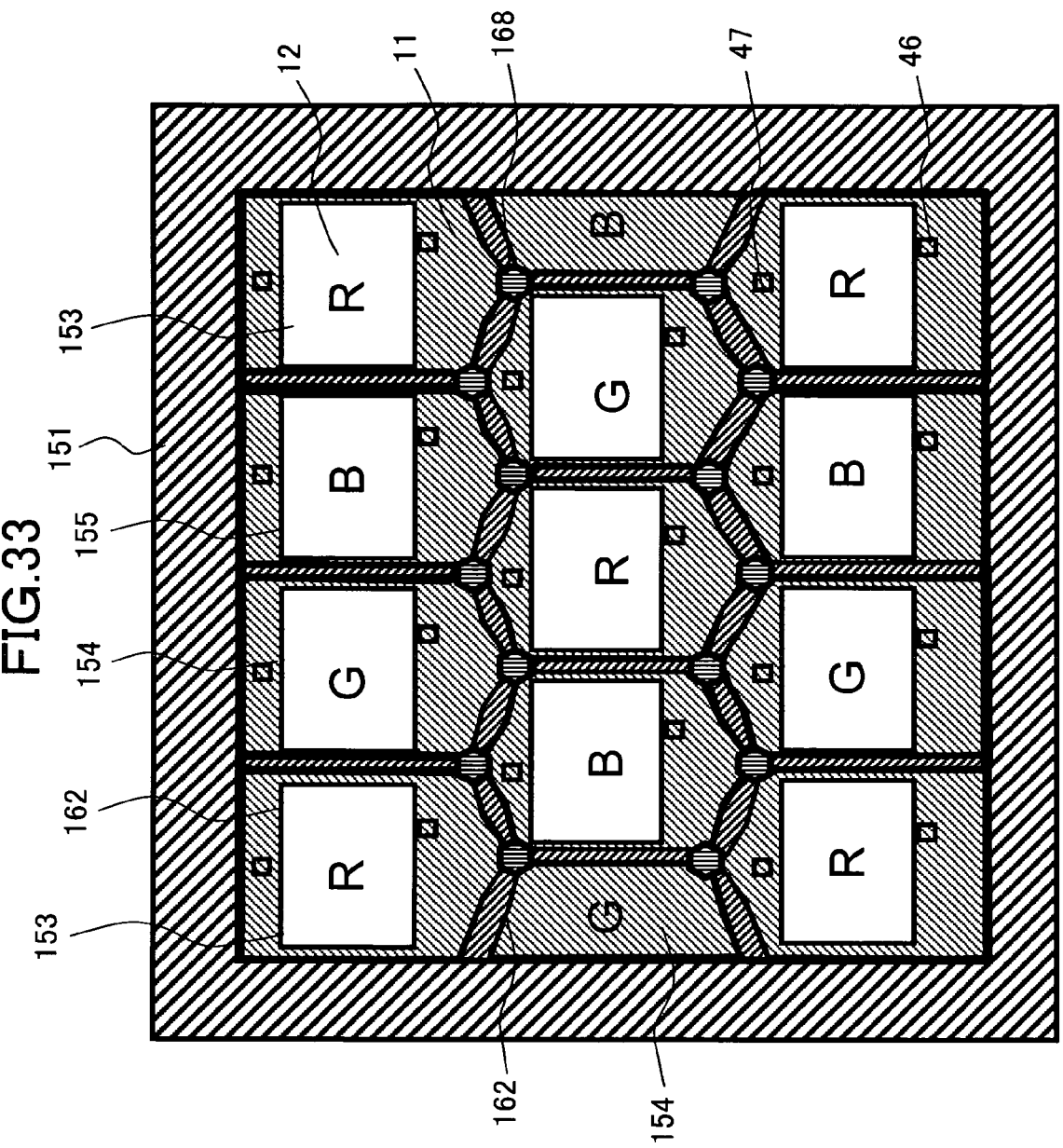

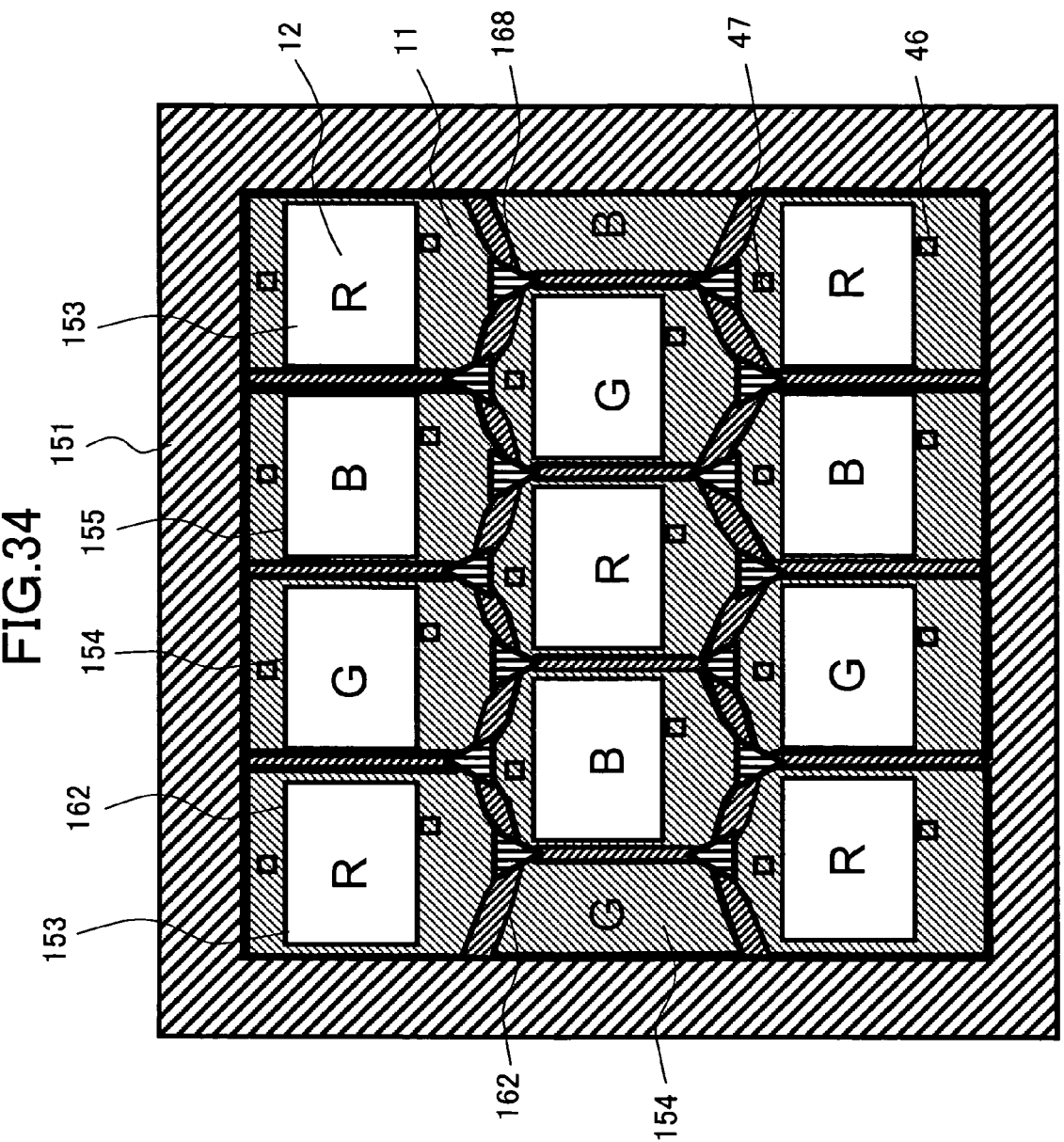

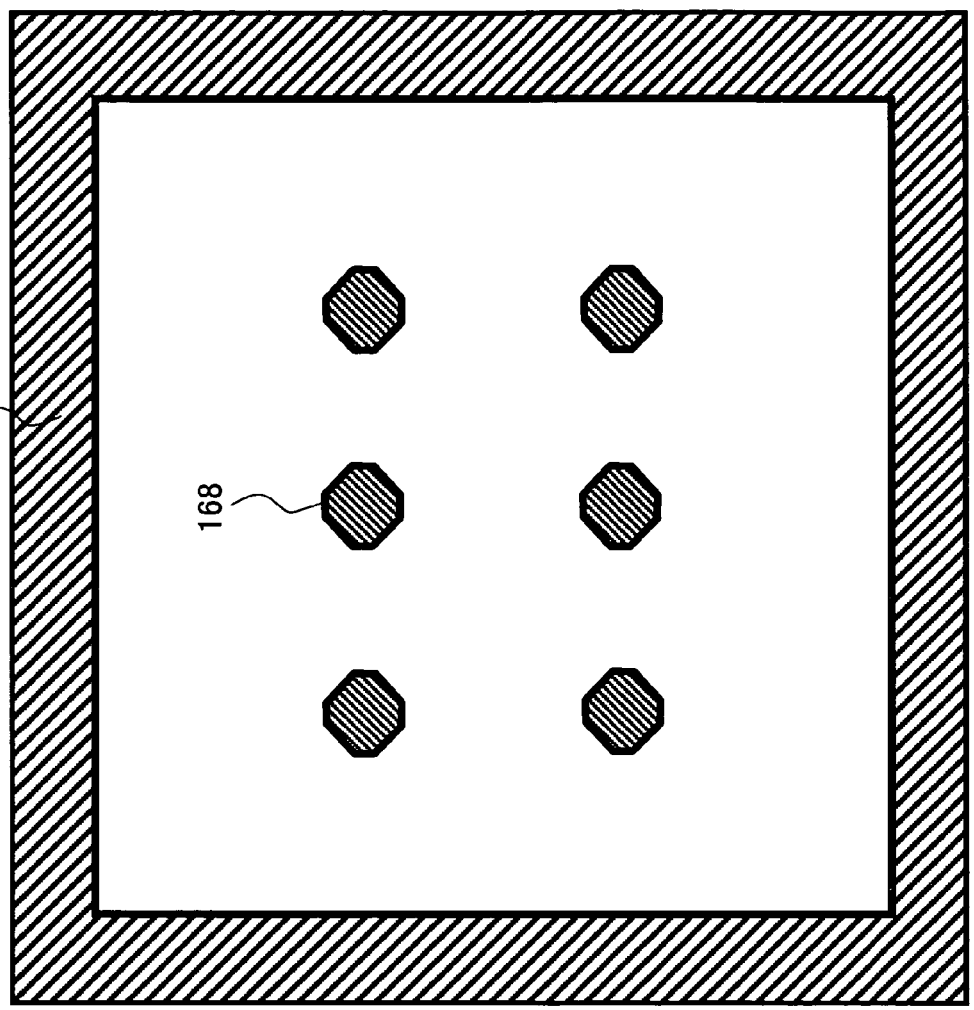

LIQUID CRYSTAL DISPLAY DEVICE

BACKGROUND OF THE INVENTION

1. Field of the Invention

The present invention relates to a display device equipped with color filters and, more particularly, to a transflective liquid crystal display having a transmissive region and a reflective region within each one pixel.

2. Description of Related Art

In recent years, so-called transflective liquid crystal displays (LCDs) operating in both reflective and transmissive display modes have been often used as display portions of mobile electronic devices.

A transflective LCD has both transmissive and reflective regions within each one pixel. The transflective LCD operates either in a transmissive display mode in which light transmits through transmissive regions formed in pixels or in a reflective display mode in which light is reflected by reflective regions formed in the pixels.

When the transflective liquid crystal display is used outdoors, the display is employed under bright ambient conditions. In this state, the reflective mode is added to the transmissive mode, and external light is used for display.

The reflective LCD has the problem that the visibility deteriorates severely when the external light is weak. On the other hand, the transmissive LCD has the problem that in cases where the external light is very intense (e.g., under fine weather, outdoor conditions), the visibility deteriorates.

A transflective LCD uses a display mode in which the reflective mode and transmissive mode are combined to solve the above-described problems. This kind of device is proposed, for example, in U.S. Pat. No. 6,654,076.

Many transflective LCDs use an active matrix structure in which thin film transistors (TFTs) are used as switching elements for selectively supplying a video signal to pixel electrodes.

In an active-matrix liquid crystal display, a TFT substrate on which TFTs and pixel electrodes are formed is disposed opposite to a color filter substrate on which color filters are mounted to provide a color display. A liquid crystal material is sealed in between the two substrates, thus completing the display. Plural video signal lines and plural scanning lines intersect each other on the TFT substrate. Plural regions partitioned by the video signal lines and scanning lines are arranged in a matrix. TFTs and a pixel electrode are formed in each region, forming a pixel.

In a liquid crystal display, a counter electrode is disposed opposite to pixel electrodes. An electric field is produced between each pixel electrode and the counter electrode. The orientation of liquid crystal molecule is changed by applying a voltage between the pixel electrode and the counter electrode. Concomitantly, the characteristics of the liquid-crystal layer for light is change. By making use of this property, a display is provided.

Generally, VA (vertical alignment) displays in which a counter electrode is formed on a color filter substrate and IPS (in-plan switching) displays in which a counter electrode is formed on a TFT substrate are known.

Color filters are formed on a color filter substrate in a corresponding manner to pixels to provide a color display. Each color filter transmits certain wavelengths of light. Three pixels form a unit color element of a color display. Each pixel has color filters of red (R), green (G), and blue (B).

SUMMARY OF THE INVENTION

In a transflective LCD, both transmissive and reflective regions are formed within each one pixel. Therefore, in transflective LCD device, the area of the transmissive or reflective region is reduced. Consequently, there is the problem that the efficiency of utilization of light (i.e., aperture ratio) decreases in a case where light from either region weakens.

A liquid crystal display according to the present invention has pixels arranged in a matrix and color filters corresponding to the pixels. Each pixel has transmissive and reflective regions. End portions of adjacent color filters are overlapped to form optically shielding portions. Outer peripheral portions of the shielding portions and reflective regions are overlapped. The overlapping color filters and reflective regions together form an optically shielding film having the same function as a black matrix for the transmissive regions.

In one feature of the transflective LCD of the present invention, the aperture ratio is improved taking account of the positional relationship between the reflective regions and the color filters.

The present invention can provide a liquid crystal display which has both reflective and transmissive regions in each pixel and which can improve the aperture ratio of the pixels. The invention also provides a display device in which a reflective region surrounds the outer periphery of a transmissive region in each pixel and in which the reflective region can be utilized as an optically shielding portion for the transmissive region.

BRIEF DESCRIPTION OF THE DRAWINGS

FIG. 10 is a plan view illustrating the process sequence for fabricating the color filter array of the liquid crystal display according to the embodiment of the invention.

FIGS. 11-A to 11C are cross-sectional views illustrating the process sequence for fabricating the color filter array of the liquid crystal display according to the embodiment of the invention.

FIGS. 12-A to 12-C are cross-sectional views illustrating the process sequence for fabricating the color filter array of the liquid crystal display according to the embodiment of the invention.

FIGS. 32-A to 32-C are cross-sectional views schematically showing the configuration of pixels of a liquid crystal display according to an embodiment of the invention.

FIG. 33 is a plan view schematically showing the configuration of pixels of a liquid crystal display according to an embodiment of the invention.

FIG. 34 is a plan view schematically showing the configuration of pixels of a liquid crystal display according to an embodiment of the invention.

FIG. 35 is a plan view illustrating a process sequence for fabricating the color filter array of a liquid crystal display according to an embodiment of the invention.

DETAILED DESCRIPTION OF THE PREFERRED EMBODIMENTS

Figure 1:
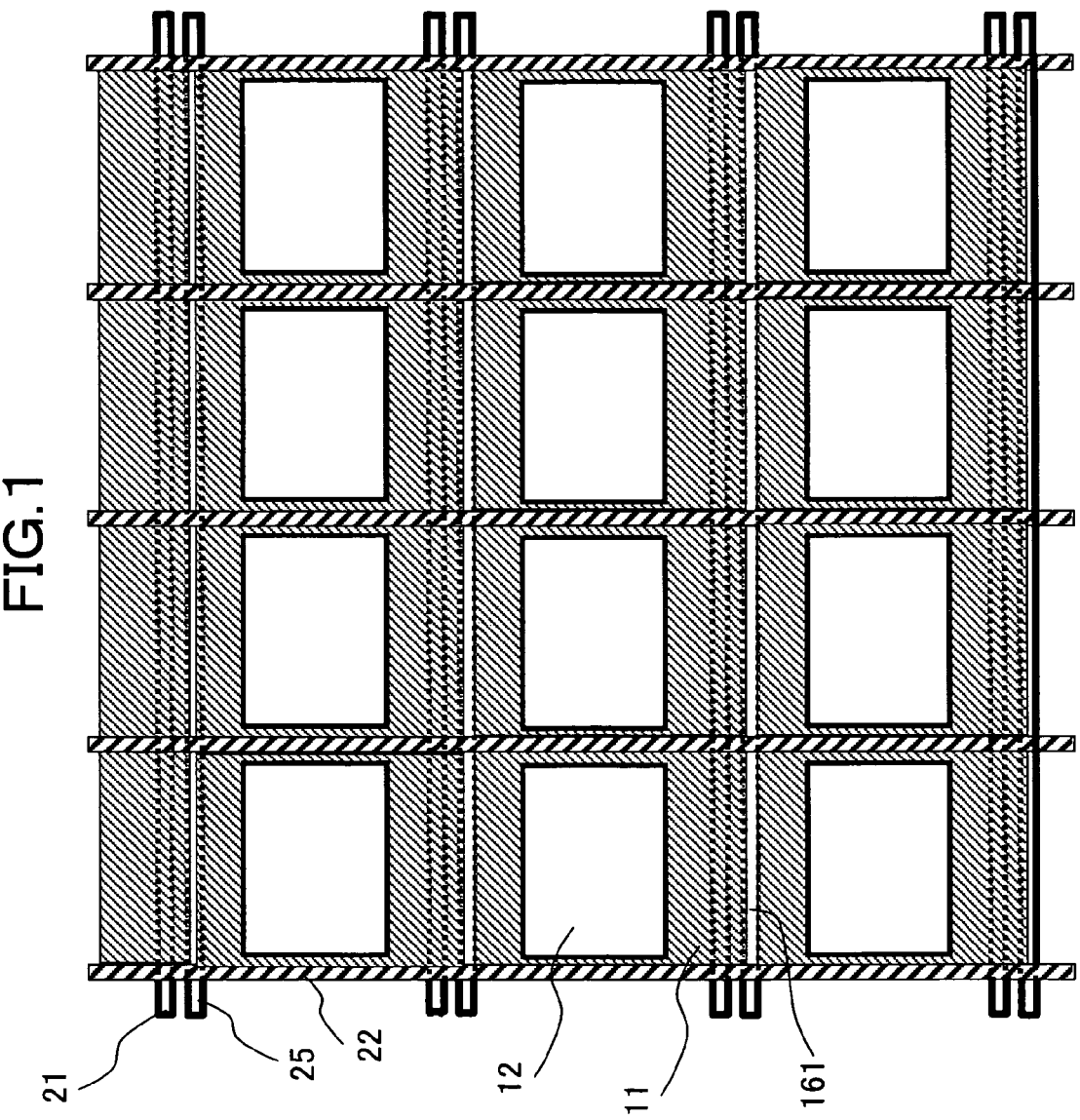
FIG. 1 is a plan view schematically showing the configuration of pixels in a liquid crystal display according to an embodiment of the present invention.

FIG. 1 is a plan view showing reflective regions 11 and transmissive regions 12 of pixels of a liquid crystal display according to the present invention. The liquid crystal display is equipped with a multiplicity of pixels arranged in a matrix. For ease of understanding, only some of the pixels of the display are shown in FIG. 1.

In FIG. 1, each area surrounded by gate signal lines (also referred to as scanning lines) 21 extending in the x-direction and juxtaposed in the y-direction and by drain signal lines (also referred to as video signal lines) 22 extending in the y-direction and juxtaposed in the x-direction is taken as a pixel region. The pixel region has the reflective region 11 and transmissive region 12.

In FIG. 1, storage capacitor lines 25 are formed parallel to the gate signal lines 21. End portions of the reflective regions 11 extend beyond the gate signal lines 21 and overlap the storage capacitor lines 25. Furthermore, the end portions of the reflective regions 11 extend parallel to the gate signal lines 21 and drain signal lines.

Each reflective region 11 is shaped to surround the corresponding transmissive region 12. Since the reflective region 11 is generally made of a metal such as aluminum that does not transmit light, the reflective region 11 has the function of an optically shielding film for the transmissive region 12.

Figure 2:
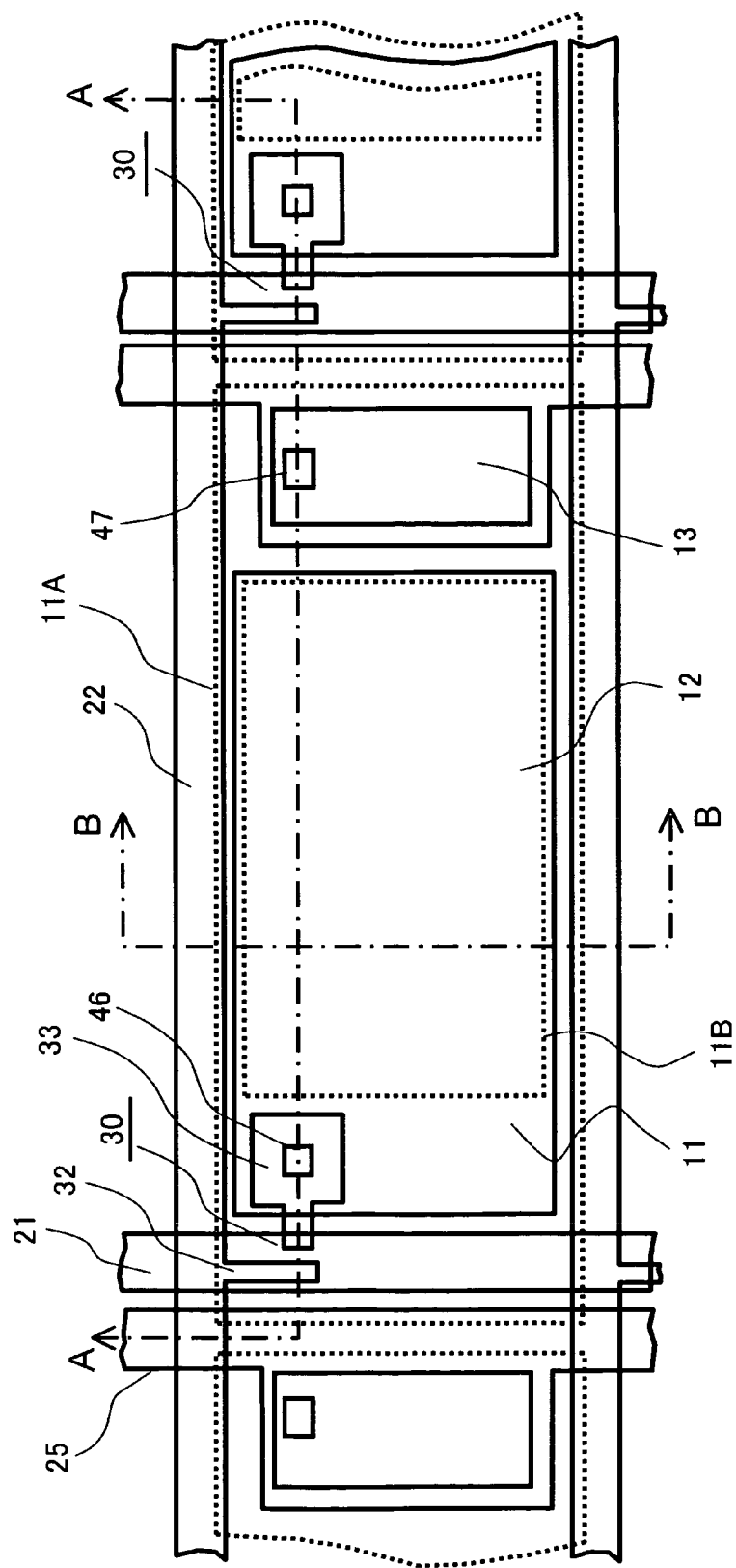
FIG. 2 is a schematic plan view showing the pixels of the liquid crystal display according to the embodiment of the invention.

FIG. 2 is a plan view illustrating the configuration of the pixels. For the sake of illustration, the reflective regions 11 of FIG. 1 are indicated by dotted lines.

Thin-film transistors (TFTs) 30 are formed near the intersections of the gate signal lines 21 and drain signal lines 22. The TFTs 30 are activated (turned on) by a gate signal supplied via the gate signal lines 21. A video signal is supplied to the TFTs 30 via the drain signal lines 22. The video signal is written to a transmissive electrode forming the transmissive region 12 and to a reflective electrode forming the reflective region 11 via active TFTs 30.

Figure 3:
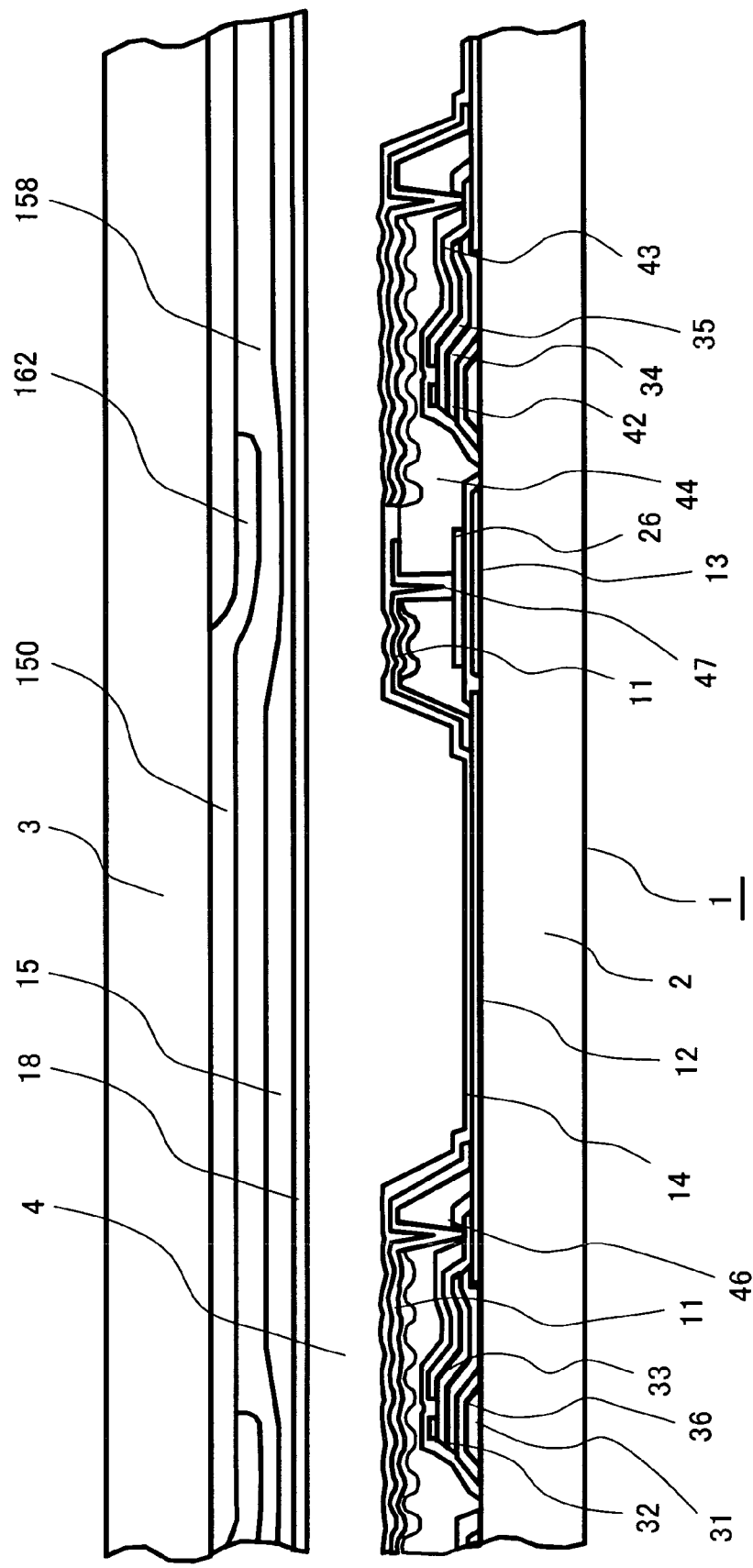
FIG. 3 is a schematic cross sectional view of one pixel of the liquid crystal display according to the embodiment of the invention.

FIG. 3 is a cross-sectional view taken on line A-A of FIG. 2. A liquid crystal panel 1 has a TFT substrate 2 and a color filter substrate 3 which are disposed opposite to each other. A liquid crystal material 4 is held between the substrates 2 and 3. A sealing material (not shown) is mounted at the peripheral portions of the TFT substrate 2 and color filter substrate 3. The TFT substrate 2, color filter substrate 3, and sealing material together form a container having a narrow gap. The liquid crystal material 4 is sealed in between the substrates 2 and 3.

The TFT substrate 2 is made of glass, resin, semiconductor, or other material. The gate signal lines 21 are formed on the TFT substrate 2 as mentioned previously. Each gate signal line 21 consists of a multilayer film including a layer consisting mainly of chromium (Cr) or zirconium and a layer consisting mainly of aluminum (Al). The side surface of each gate signal line 21 is so tilted that the line width increases from the top surface toward the lower surface of the TFT substrate. Parts of the gate signal lines 21 form gate electrodes 31. A gate insulator film 36 is formed to cover the gate electrodes 31. A semiconductor layer 34 consisting of a film of amorphous silicon is formed over the gate insulator film 36.

A dopant is implanted into an upper part of the semiconductor layer 34 to form an n+ layer 35, which is formed such that the semiconductor layer 34 is electrically well connected. Drain electrode 32 and source electrode 33 are spaced from each other on the semiconductor n+ layer 35. The electrodes are referred to either as drain or source, depending on the potential. In the present specification, the electrode connected with any drain signal line 22 is referred to as a drain.

Each of the drain signal lines 22, drain electrodes 32, and source electrode 33 is made of a multilayer film including an interposer layer consisting mainly of aluminum, the interposer layer being sandwiched between two layers each of which mainly consists of tungsten (W). The source electrode 33 is electrically connected with the transmissive region 12 and reflective region 11. An inorganic insulator film 43 and an organic insulator film 44 are formed to cover the TFTs 30. The source electrode 33 is connected with the reflective region 11 and transmissive region 12 via through-holes 46 formed in the inorganic insulator film 43 and organic insulator film 44. The inorganic insulator film 43 can be made of silicon nitride or silicon oxide. The organic insulator film 44 can be made of an organic resinous film. Although the surface of the organic insulator film 44 can be made relatively flat, the surface can also be processed to be uneven.

The reflective region 11 is made of a reflective electrode and has an optically exit side on which a conductive film is formed. The conductive film is made of a metal having a high reflectivity for light such as aluminum. Where the reflective electrode is made of a multilayer film, a layer consisting mainly of aluminum is formed on the surface of a layer consisting mainly of tungsten or chromium. The transmissive region 12 is made of a transparent conductive film. In the following description, the reflective electrode and transparent electrodes may be indicated by reference numerals 11 and 12, respectively.

The transparent conductive film is made of a transparent conductive layer of ITO (indium-tin oxide), ITZO (indium-tin zinc oxide), IZO (indium-zinc oxide), ZnO (zinc oxide), SnO (zinc oxide), or $In_2O_3$ (indium oxide).

The aforementioned layer consisting mainly of chromium is made of chromium alone or an alloy of chromium and molybdenum (Mo). The layer consisting mainly of zirconium is made of zirconium alone or an alloy of zirconium and molybdenum. The layer consisting mainly of tungsten is made of tungsten alone or an alloy of tungsten and molybdenum. The layer consisting mainly of aluminum is made of aluminum alone or an alloy of aluminum and neodymium.

In FIG. 3, the upper surface of the organic insulator film 44 is made uneven photolithographically. Therefore, the reflective electrode 11 formed on the organic insulator film 44 also has unevenness. As a result, more reflected light is scattered.

The portion of the organic insulator film 44 and inorganic insulator film 43 which is over the transmissive electrode 12 is removed, forming an opening. The reflective electrode 11 is formed to surround the outer periphery of the opening. The side surface of the opening on the side of the transmissive electrode 12 is tilted. The reflective electrode 11 is formed on the tilted surface and electrically connected with vicinities of the transparent electrode 12.

Each holding capacitive portion 13 is connected with the storage capacitor lines 25. A holding capacitive electrode 26 is formed on the opposite side of the inorganic insulator film 43 from the holding capacitive portion 13 such that the capacitive portion 13 and capacitive electrode 26 cooperate to form a holding capacitor. The capacitive electrode 26 and reflective electrode 11 are connected via a through-hole 47 formed in the organic insulator film 44.

The holding capacitive portions 13 can be fabricated from the same material as the gate signal lines 21 using the same process sequence as used to fabricate the gate signal lines 21, in the same way as the storage capacitor lines 25. Furthermore, the holding capacitive electrodes 26 can be fabricated from the same material as the drain signal lines 22 using the same process sequence as used to fabricate the drain signal lines 22. The holding capacitive electrodes 26 can perform the function of electrodes of holding capacitors if the electrodes 26 are connected with the transparent electrodes 12, in addition to the reflective electrodes 11.

Color filters 150 are formed over the color filter substrate 3 in a corresponding manner to the pixels. The color filters 150 overlap each other at the boundaries between the two adjacent color filters 150, forming optically shielding portions 162. The shielding portions 162 will be described in detail later.

An overcoat film 158 is formed to cover the color filters 150. A counter electrode 15 is formed on the side of the overcoat film 158 which faces the liquid crystal material 4. In the case of an IPS device, the counter electrode is formed at the TFT substrate side. An orientation film 18 is formed on the side of the liquid crystal material 4.

Figure 4:
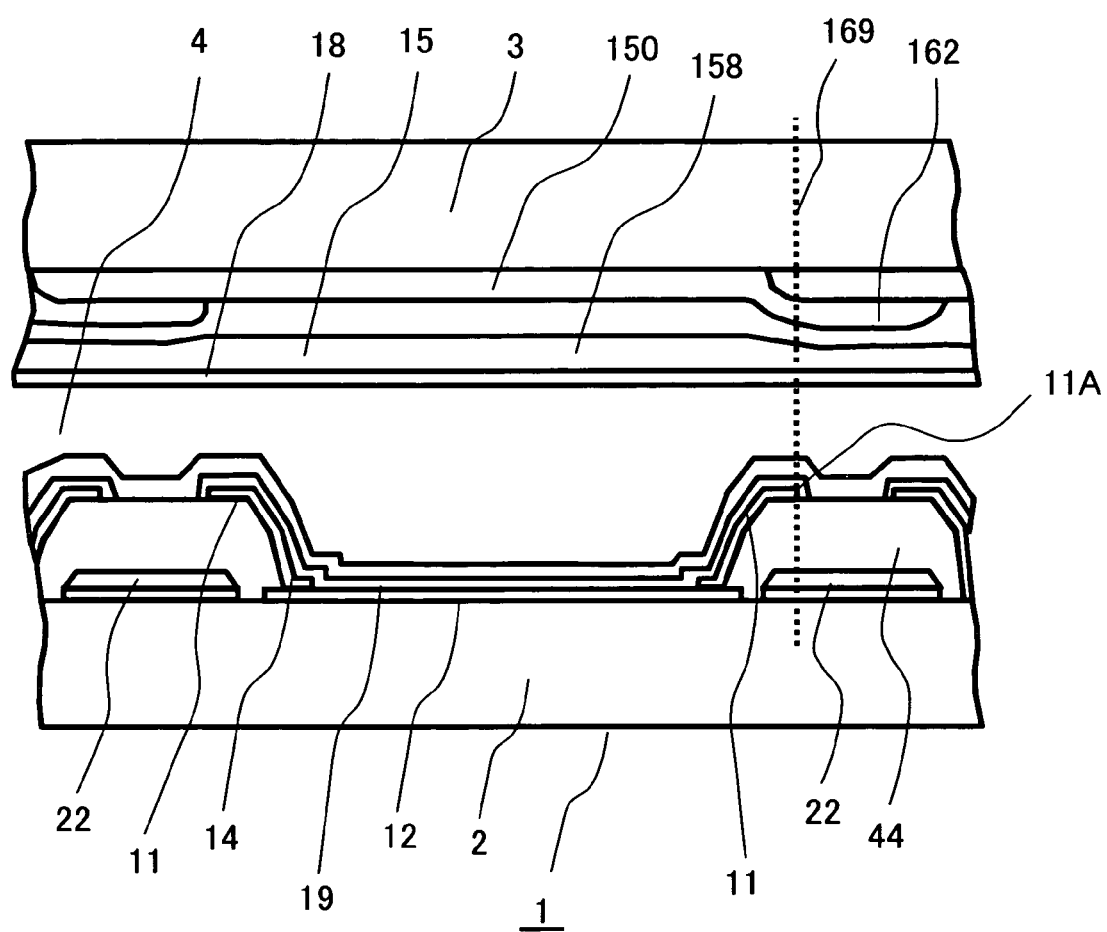
FIG. 4 is a schematic cross sectional view of one pixel of the liquid crystal display according to the embodiment of the invention.

FIG. 4 is a cross-sectional view taken on line B-B of FIG. 2. The transparent electrode 12 is formed between two drain signal lines 22. The organic insulator film 44 is formed to cover the drain signal lines 22. The reflective electrode 11 is formed over the organic insulator film 44. The reflective electrode 11 is also formed on the tilted side surface of the organic insulator film 44 and reaches to above the transparent electrode 12. The reflective electrode 11 and transparent electrode 12 are electrically connected near the side surface of the organic insulator film 44.

A boundary line 169 is a virtual line used for illustration and extends up and down from an end portion 11A of the reflective electrode 11. This indicates that the optically shielding portion 162 that is an overlap of the adjacent color filters exists on an extension line to the boundary line 169 and that the end portion 11A of the reflective electrode overlaps the optically shielding portion 162. The boundary line 169 also intersects the drain signal lines 22. It is also shown that the end portion 11A of the reflective electrode overlaps the drain signal lines 22.

Since the end portion 11A of the reflective electrode 11 overlaps the optically shielding portion 162 in this way, light leakage from the vicinities of the reflective electrode 11 can be prevented. Furthermore, the reflective electrodes 11 are formed to surround the transparent electrode 12. Consequently, the reflective electrode 11 and the optically shielding portion 162 cooperate to perform the function of an optically shielding film similar to a black matrix for the transparent electrode 12.

A conductive film consisting mainly of aluminum is used at the surface of the reflective film. The surface that is electrically connected with the transparent conductive film is made of an alloy of chromium and molybdenum or an alloy of tungsten and molybdenum to lower the electrical resistance of the contacting portion.

As shown in FIG. 4, the reflective electrode 11 is formed in a narrow area lying over the drain signal line 22. However, the reflective electrode is formed to surround the transparent electrode 12 formed in the center of the pixel, thus performing the function of an optically shielding film.

Additionally, the reflective electrode is used also to electrically connect the through-holes 46 and 47 formed in the opposite sides of the transparent electrode 12. The transparent electrode 12 can be placed at a uniform electrical potential in a short time by forming the reflective electrode 11 around the transparent electrode 12 and supplying a video signal from around the transparent electrode 12 using the reflective electrode 11 having a low resistance value. Hence, the display quality can be improved.

Referring still to FIG. 4, a second transparent electrode 19 is formed over the reflective electrode 11 and transparent electrode 12. The transparent conductive film is formed to overlap the reflective electrode 11 made of a metal. Consequently, the transparent electrode 12 and reflective electrode 11 are comparable in apparent electrical resistance. This stabilizes the display quality. In this case, priority is placed on higher reflectivity for light. Thus, the transparent conductive film is directly formed on aluminum or on an aluminum-based alloy.

Figure 5:
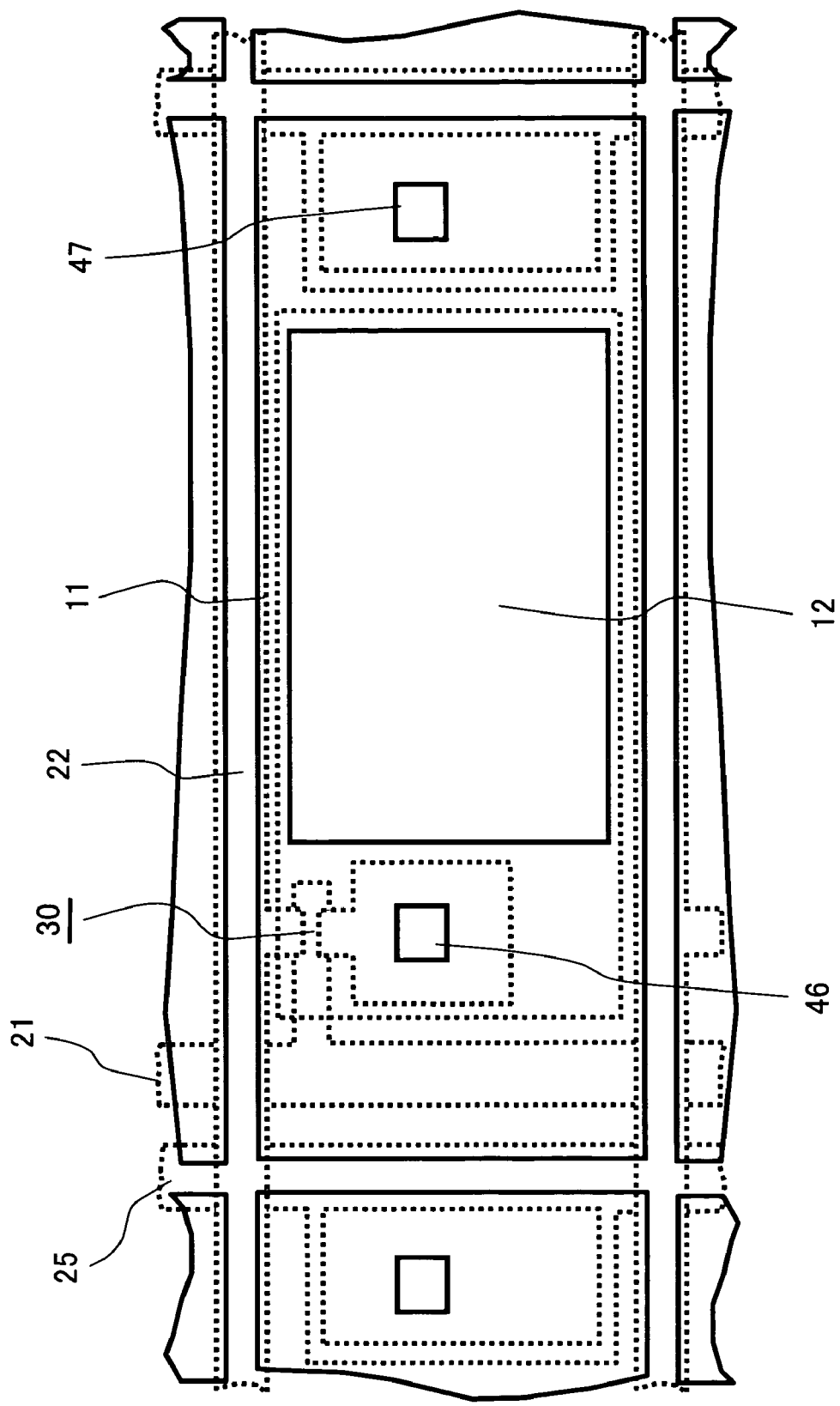
FIG. 5 is a schematic plan view of one pixel of the liquid crystal display according to the embodiment of the invention.

FIG. 5 is a plan view illustrating the positional relationship between the reflective electrode 11 and the components of one pixel. The end portion of the reflective electrode 11 is indicated by the solid line. The other portions are indicated by the dotted lines. As shown in FIG. 5, the reflective electrode 11 covers most of the pixel except for the opening in the transparent electrode 12.

If the gate signal lines 21 and drain signal lines 22 are made of an opaque metal film, the light from the rear surface of the TFT substrate passes through from the opening in the reflective electrode 11 formed over the transparent electrode 12. The reflective electrode 11, gate signal lines 21 (or capacitor signal lines 25), and drain signal lines 22 can perform the function of an optically shielding film.

Figure 6:
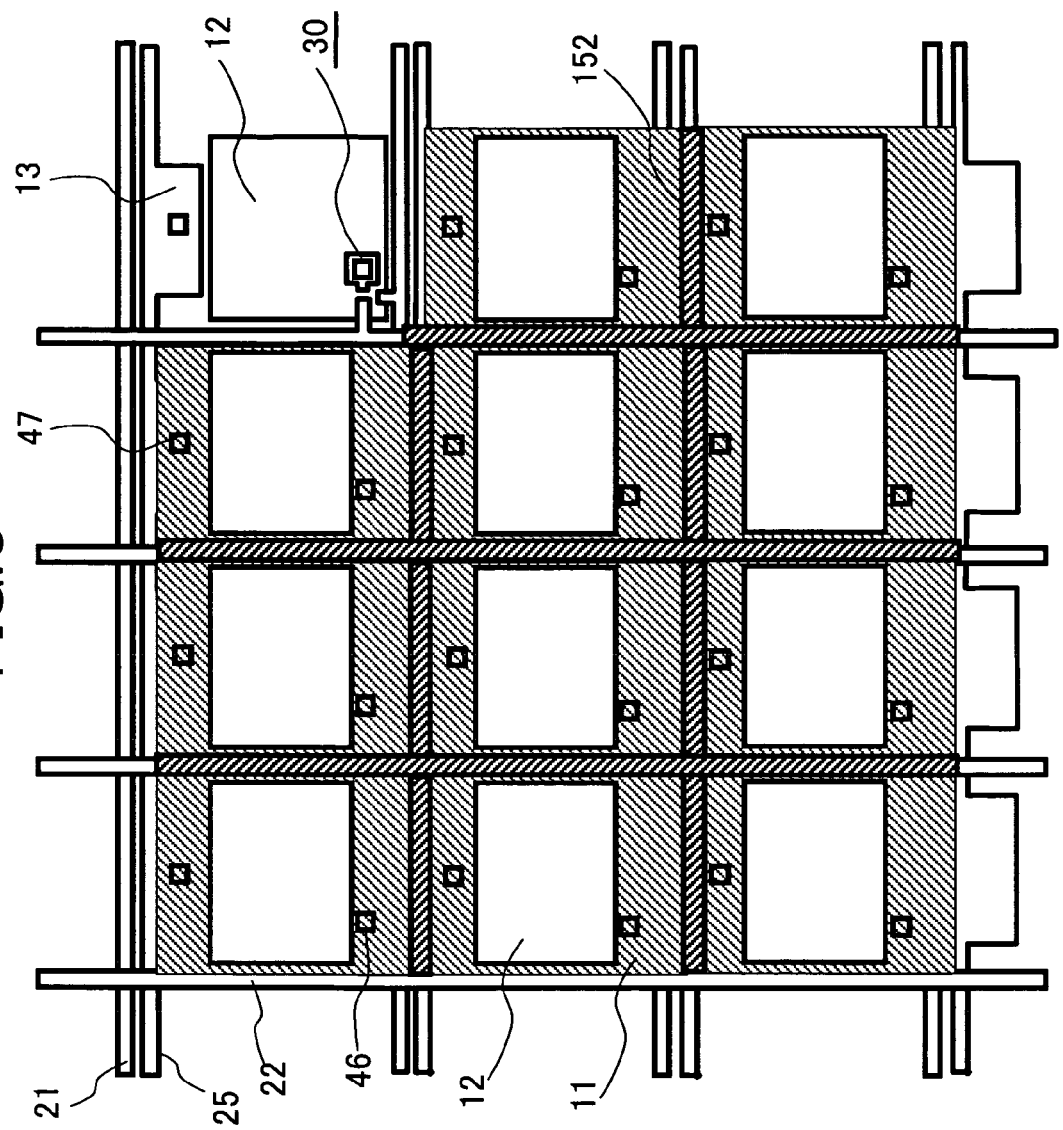
FIG. 6 is a plan view schematically showing some pixels of the liquid crystal display according to the embodiment of the invention.

FIG. 6 is a plan view showing the manner in which each pixel is covered with the reflective electrode 11. For the sake of illustration, the reflective electrode 11 has been removed from the single pixel at the right upper end.

The reflective electrode 11 covers most of the pixel except for the opening. However, the reflective electrode 11, gate signal lines 21, and drain signal lines 22 overlap each other in narrow areas. The reflective electrode 11 and pixel must be aligned to a tight tolerance. Accordingly, light leakage can be prevented by forming the optically shielding film (black matrix) 152 over the color filter substrate 3. However, the aperture ratio (i.e., the efficiency of utilization of light) decreases, because the reflective electrode 11 is partially covered with the optically shielding film.

Figure 7:
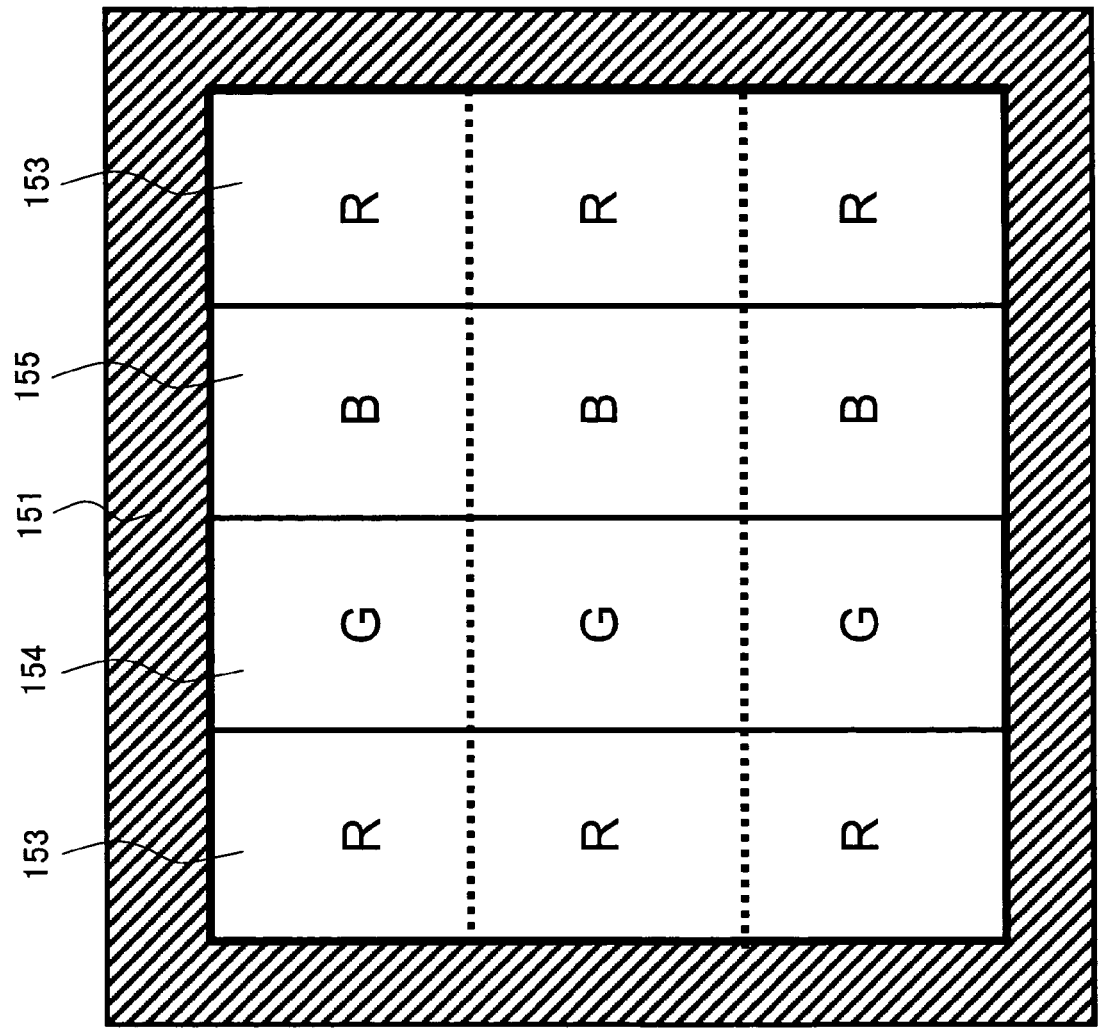
FIG. 7 is a plan view schematically showing the configuration of the color filter array of the liquid crystal display according to the embodiment of the invention.

FIG. 7 is a plan view of the color filter substrate 3, and in which the optically shielding film has been removed from the pixel region. In FIG. 7, the optically shielding film is not formed in regions opposite to the pixels on the color filter substrate. Therefore, in FIG. 7, the aperture ratio is increased compared with the case where a black matrix is formed. However, the surroundings of the pixel regions need to be optically shielded. Therefore, an optically shielding film 151 is formed from a metal such as chromium or black resin around the color filter substrate 3. The color filter array of FIG. 7 is known as a vertically striped color filter array. Color filters of the same color are arrayed vertically.

In the following description, the pixel region is represented by 4 color filters (pixels) arrayed horizontally and 3 color filters arrayed vertically, for ease of understanding of the figures. In an actual display, a multiplicity of color filters are formed in a matrix on the color filter substrate according to the display specifications.

Figure 8:
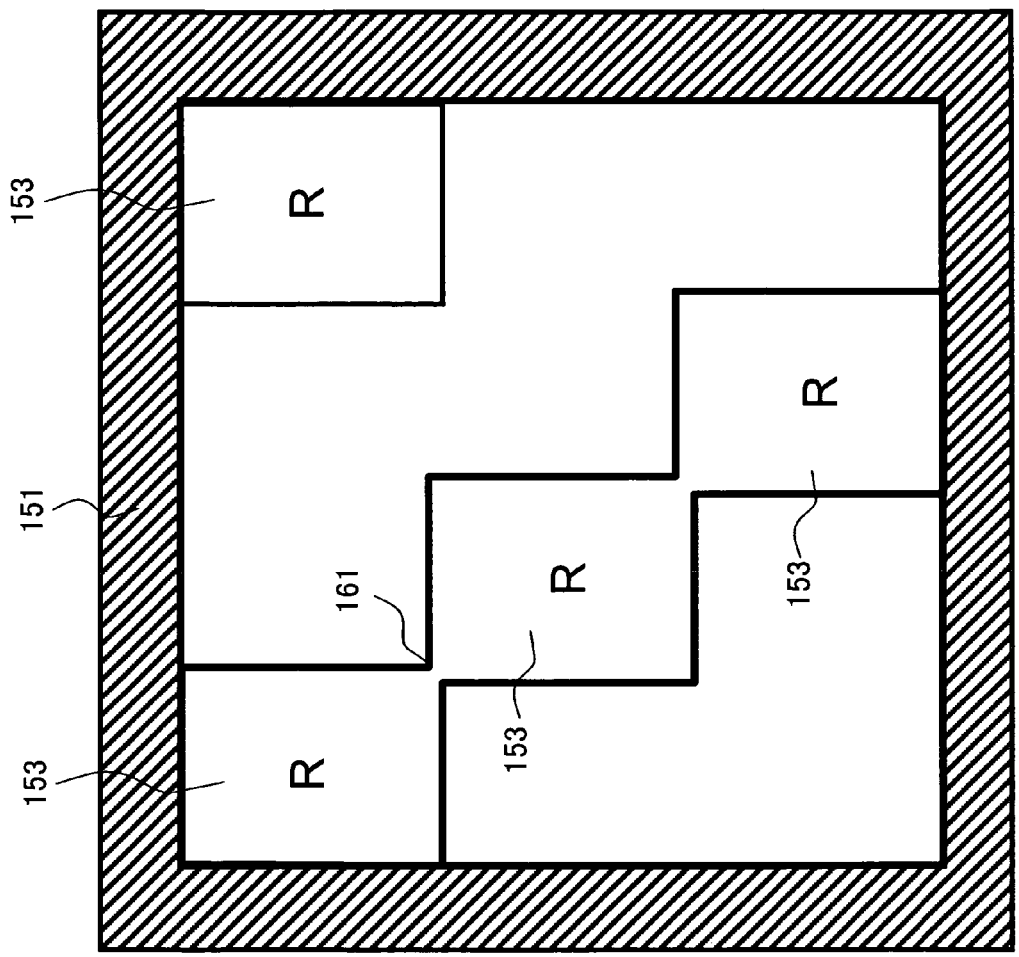
FIG. 8 is a plan view illustrating a process sequence for fabricating the color filter array of a liquid crystal display according to an embodiment of the invention.
Figure 9:
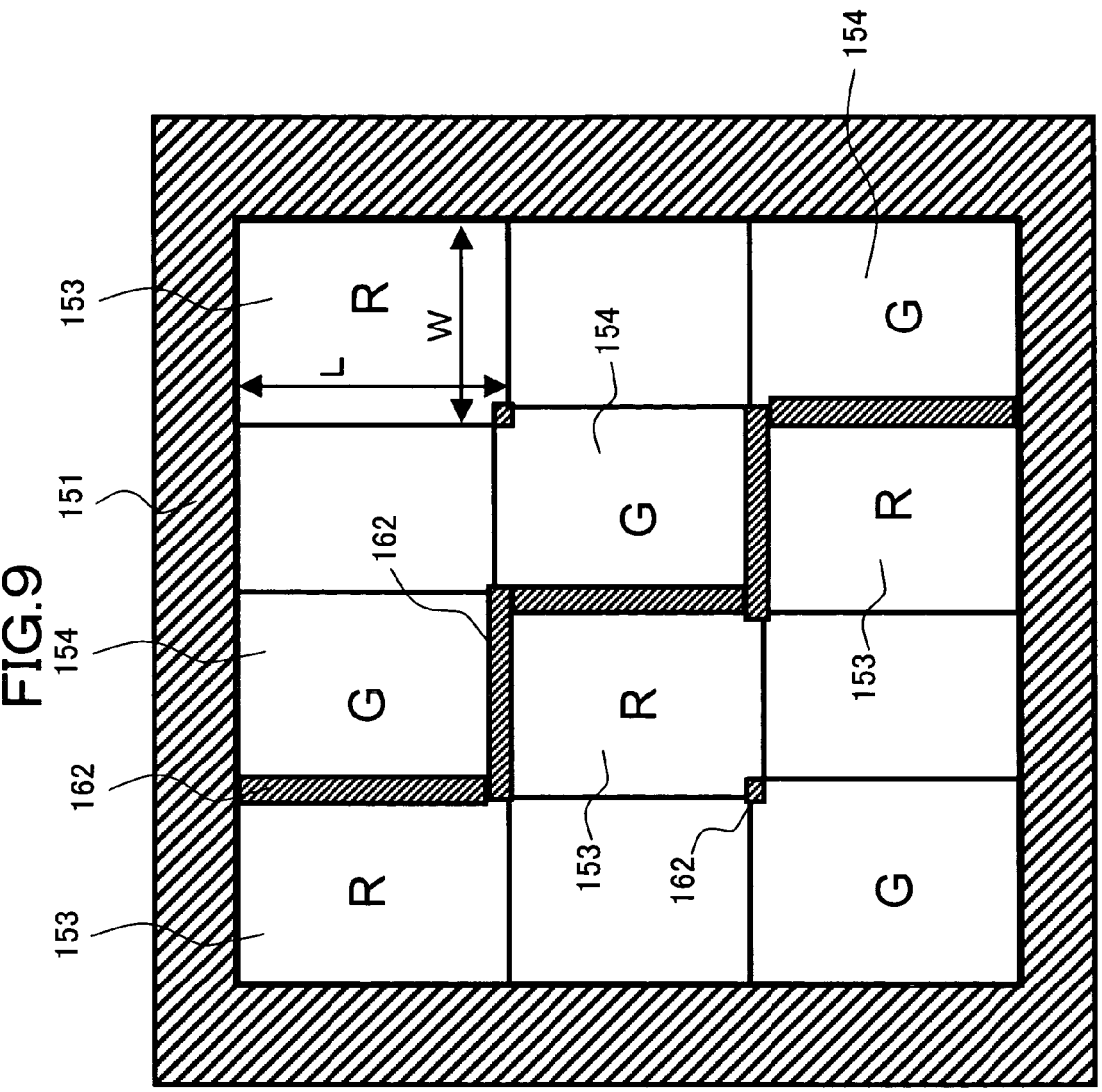
FIG. 9 is a plan view illustrating the process sequence for fabricating the color filter array of the liquid crystal display according to the embodiment of the invention.

A color filter array of oblique arrangement in which color filters of the same color are arrayed obliquely is shown in FIGS. 8-10. As shown in FIG. 8, color filters of the first color (R) are first formed obliquely. The process sequence for forming the color filters consists of applying resins including pigments of various colors or dyes to a substrate of glass or resin and photolithographically patterning the colored resins in a desired manner. Where color filters of three colors are formed, color filters of each color are formed in turn.

In FIG. 8, the color filters are patterned to produce overlaps between the adjacent ones of the color filters. Therefore, the color filters are so patterned that color filters obliquely adjacent to each other are connected at 161. There is the problem that the patterned color filters are narrowed at the obliquely connected corner 161. The problem regarding the corner 161 will be described in detail later.

Then, color filters of the second color (G) are formed as shown in FIG. 9. The color filters of the second color are formed to overlap the color filters of the first color. The color filters of the two colors overlap with each other at 162. In red color filters indicated by R, the transmissivity for light is low except at wavelengths of red. In green color filters indicated by G, the transmissivity for light is low except for wavelengths of green. In the overlap 162 between the filters of R and G, the transmissivity for the visible range of wavelengths of light is low and hence the function of an optically shielding film is performed.

Assume that each pixel has a vertical dimension (or, length) L of about 150 μm and a lateral dimension (or, width) W of about 50 μm. The width of the overlap 162 is 6 to 8 μm.

Then, as shown in FIG. 10, a resin containing a pigment or dye of the third color is applied. Then, the resin is patterned to form color filters. If the color filters of the third color are overlapped on the color filters of the other colors, the optically shielding portion 162 is formed between the adjacent color filters. The shielding portion 162 is formed to surround the outer periphery of each color filter.

FIG. 11 is a cross-sectional view illustrating a process sequence for fabricating each color filter. In FIG. 11-A, a resin 153 including a pigment of the first color is applied to the color filter substrate 3. A photomask is formed on the resin and exposed. In the present embodiment, a negative photoresist and the resin 153 including the pigment are used. Therefore, the exposed portions are left undeveloped as shown in FIG. 11-B. Of course, a positive photoresist can also be used.

Then, as shown in FIG. 11-C, a resin 154 including a pigment of the second color is applied to the resin 153. The resin 154 is then exposed and developed in a similar manner to form color filters of the second color as shown in FIG. 12-A. End portions of the color filters of the second color overlap the color filters of the first color. In the overlaps, the transmissivity is lowered for the wavelengths of the visible range of light.

Then, as shown in FIG. 12-B, a resin 155 including a pigment of the third color is applied to the resin 153 forming the color filters of the first color and to the resin 154 forming the color filters of the second color. Then, the resin 155 is similarly exposed and developed to form color filters of the third color as shown in FIG. 12-C. The color filters of the third color overlap the other color filters at their both ends. In the overlaps, the transmissivity for light is lowered. Therefore, as shown in FIG. 10, parts having a lowered transmissivity for light are formed at the peripheries of the color filters. These parts act as a black matrix.

Figure 13:
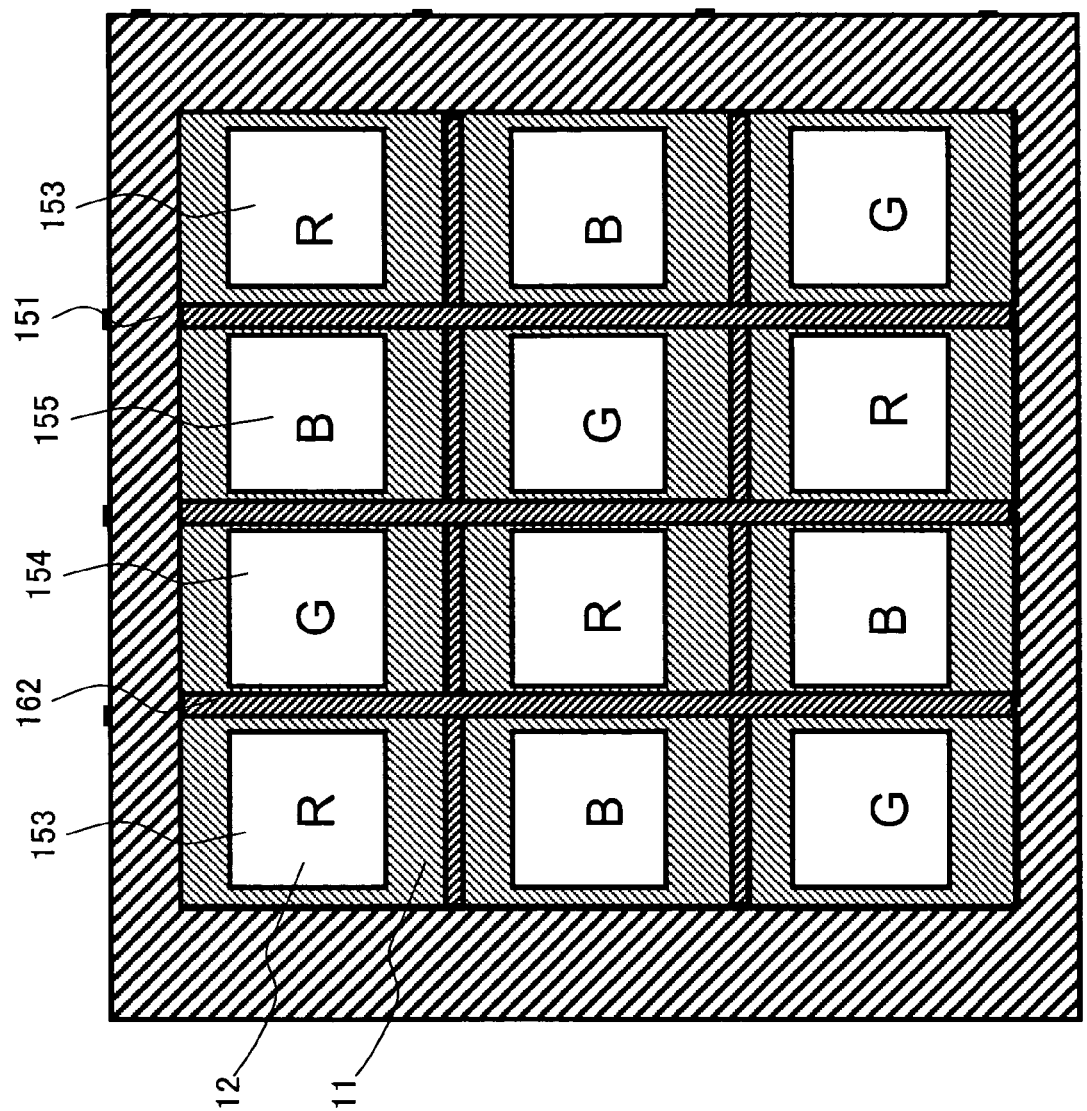
FIG. 13 is a plan view schematically showing the configuration of pixels of a liquid crystal display according to an embodiment of the invention.

FIG. 13 shows the manner in which color filters having the optically shielding portions 162 that are overlaps between the adjacent color filters are overlapped on the TFT substrate having the reflective and transmissive regions. In FIG. 13, the color filter substrate shown in FIG. 10 is overlapped on the TFT substrate shown in FIG. 1.

When viewed on a plane, the optically shielding portion 162 that is an overlap between color filters is formed between two adjacent reflective regions 11. The overlapping shielding portions 162 hide end portions of the reflective regions 11.

Therefore, leakage of light from between the reflective regions 11 can be prevented by the optically shielding portion 162. Furthermore, the overlapping shielding portion 162 and reflective region 11 perform the function of an optically shielding film for the transmissive region 12.

Both transsmissive region 12 and reflective region 11 are hidden only slightly by the optically shielding portion 162 that is an overlap between the color filters. Hence, the aperture ratio is maintained high. It is conceivable that the area of the transmissive region 12 is increased to enhance the aperture ratio of the transmissive region 12. However, this will reduce the area of the reflective region 11, which in turn will reduce the aperture ratio of the reflective region 11. Accordingly, leakage of light from between the reflective regions 11 is prevented by extending each reflective region 11 close to the boundary with the adjacent pixel while using the reflective region 11 as an optically shielding portion for the transmissive region 12 and forming the shielding portion 162 where the adjacent color filters overlap.

Figure 14:
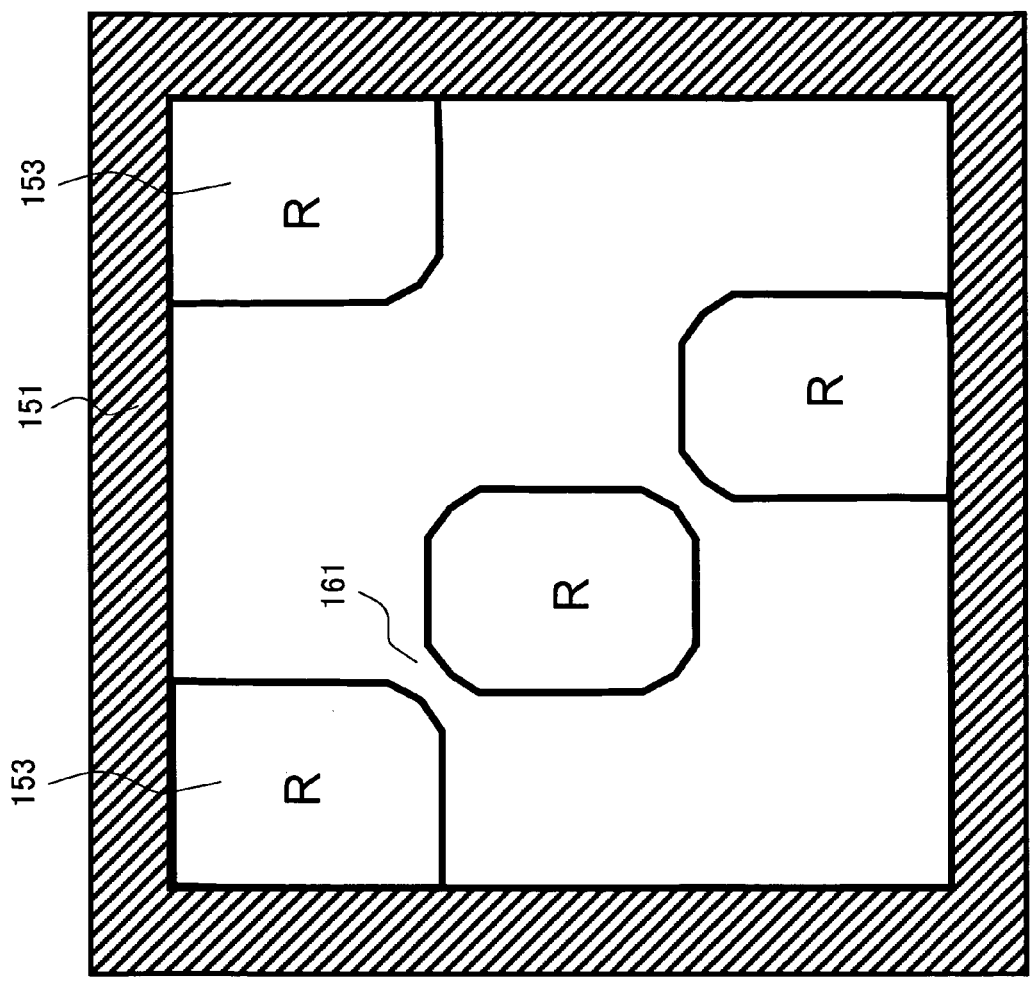
FIG. 14 is a plan view showing a process sequence for fabricating the color filter array of a liquid crystal display according to another embodiment of the invention.

A case is described in which adjacent patterns are not connected at the corner 161 because the pattern at the corner 161 shown in FIG. 8 is narrow. For example, where the resin 153 including the pigment is of the negative type, if the corner 161 is not sufficiently exposed with light, the resin is not sufficiently cured at the corner 161. Therefore, as shown in FIG. 14, insufficiently cured resin is removed, rounding the corner 161. At the corner 161, the two sides forming an angle toward the apex have been less spaced apart from each other and thus are more affected by interference due to reflected light. It is considered that this can also be a cause of shortage of the amount of illuminating light.

Figure 15:
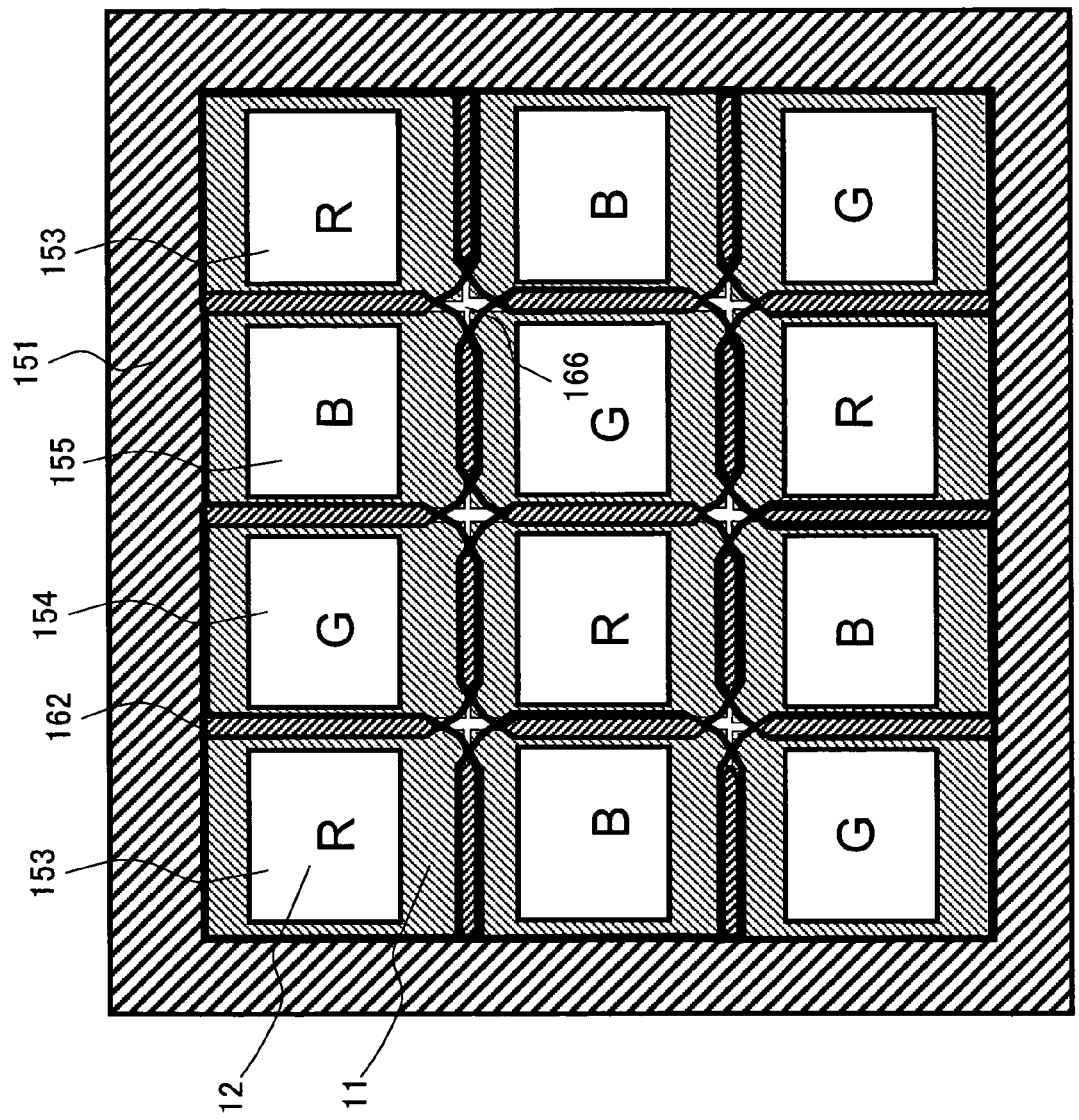
FIG. 15 is a plan view schematically showing the configuration of pixels in a liquid crystal display according to an embodiment of the invention.

FIG. 15 shows the manner in which a gap is produced near the corner 161 because the corner 161 has been rounded. In the gap 166 close to the corner, the optically shielding portion 162 where adjacent color filters overlap should be formed. Another gap 166 is also present between two adjacent reflective regions 11. Since the boundaries of the gap 166 and reflective region 11 overlap, light leaking from the gap between the reflective regions 11 is observed when black is displayed. This can be a factor leading to a deterioration of the contrast.

Figure 16:
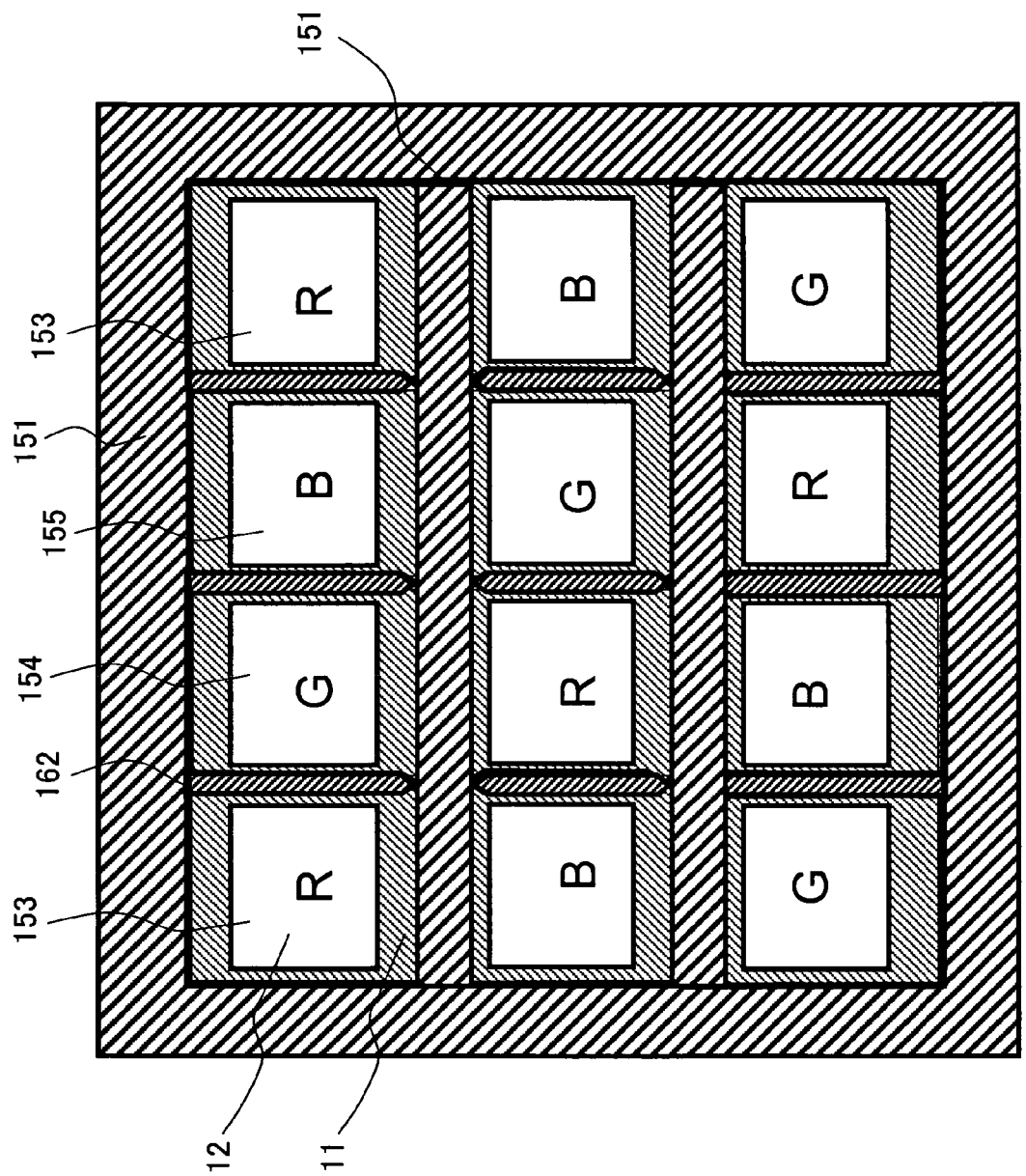
FIG. 16 is a plan view schematically showing the configuration of pixels in a liquid crystal display according to an embodiment of the invention.

A structure that covers the gap close to the corner 161 with the optically shielding film 151 is shown in FIG. 16. The shielding film 151 is formed to optically shield the surroundings of the color filters. This shielding film 151 is so formed as to cover the gap close to the corner 161, thus preventing leakage of light from the gap. In FIG. 16, however, the optically shielding film is not formed to extend vertically and horizontally such as a related art black matrix. Rather, the shielding film extends only horizontally.

Figure 17:
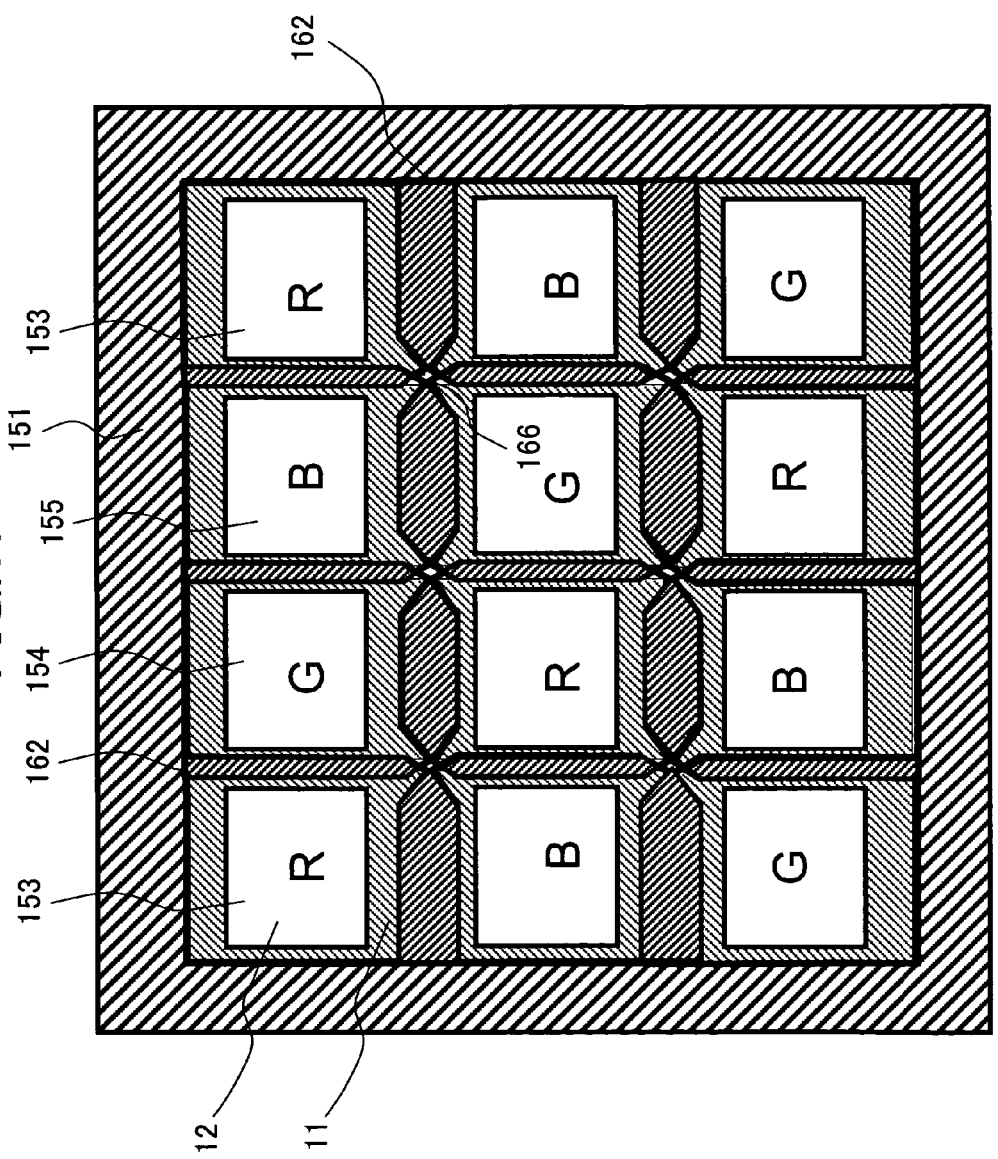
FIG. 17 is a plan view schematically showing the configuration of pixels in a liquid crystal display according to an embodiment of the invention.

FIG. 17 shows the manner in which some of the overlapping, optically shielding portions 162 have been widened. In FIG. 17, the width of the vertically extending, optically shielding portions 162 (i.e., vertical overlaps between color filters) is made larger than the width of the horizontally extending, optically shielding portions 162 (i.e., horizontal overlaps between color filters) to thereby prevent presence of any gap around the corner 161. In FIG. 17, all the gaps are filled up. With respect to the reflective regions 11, the area hidden by the optically shielding portions 162 is increased, thus deteriorating the aperture ratio.

Figure 18:
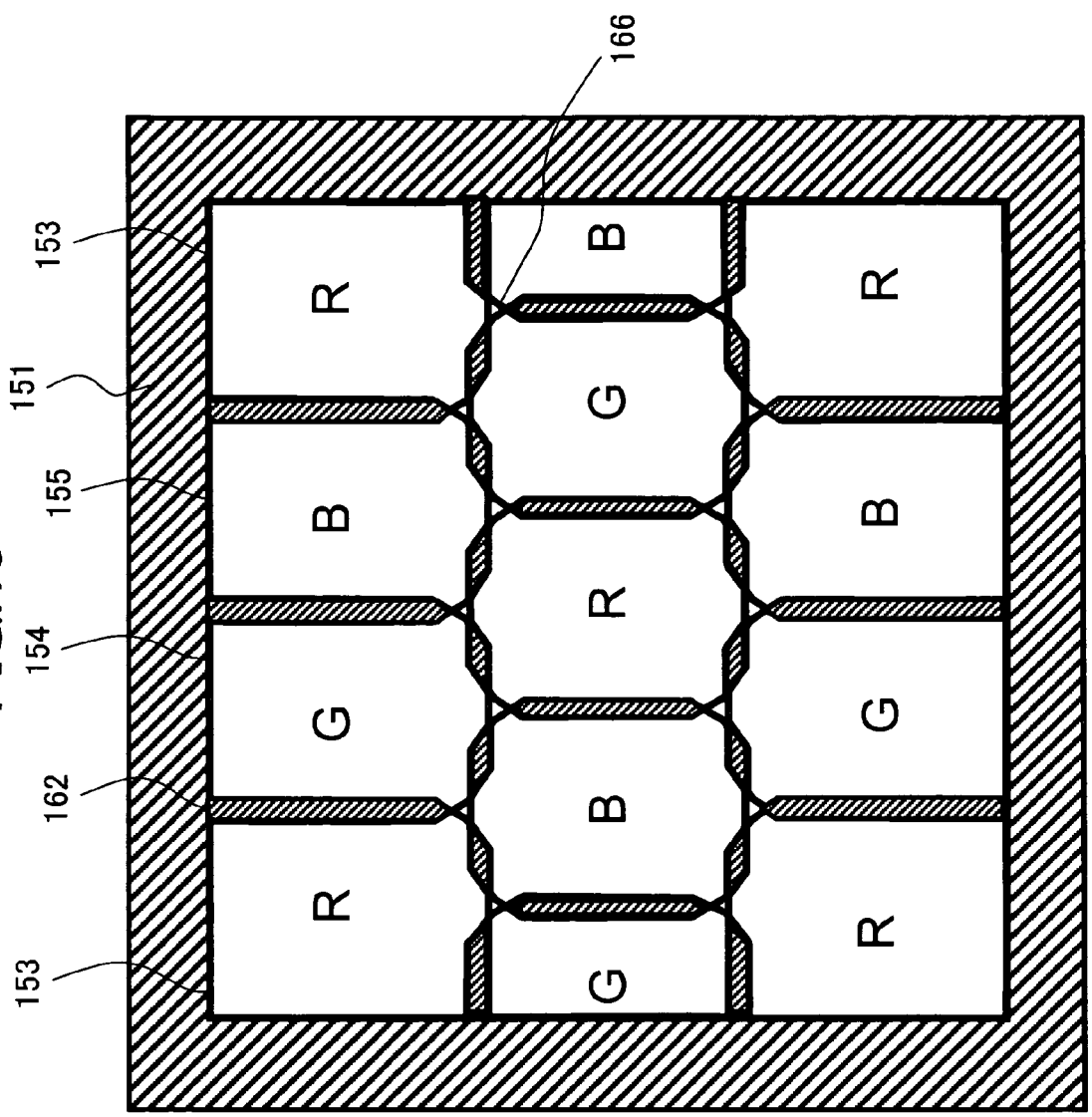
FIG. 18 is a plan view illustrating a process sequence for fabricating the color filter array of a liquid crystal display according to an embodiment of the invention.

In FIG. 18, the array of color filters has been modified without varying the width of the overlapping portions. The first stage of color filters 153(1) and second stage of color filters 153(2) are shifted with respect to each other by a distance equal to a half of a pixel. This arrangement is hereinafter referred to as the delta arrangement. Any two corners 161 are not opposite to each other. For example, a corner 161 of one color filter 153(2) of the second stage is located near the centerline of an adjacent color filter 153(1) of the first stage. Since there are not any two corners 161 opposite to each other, the gaps have been reduced in size. In the delta arrangement, 6 corners 161 are created around each one pixel.

Figure 19:
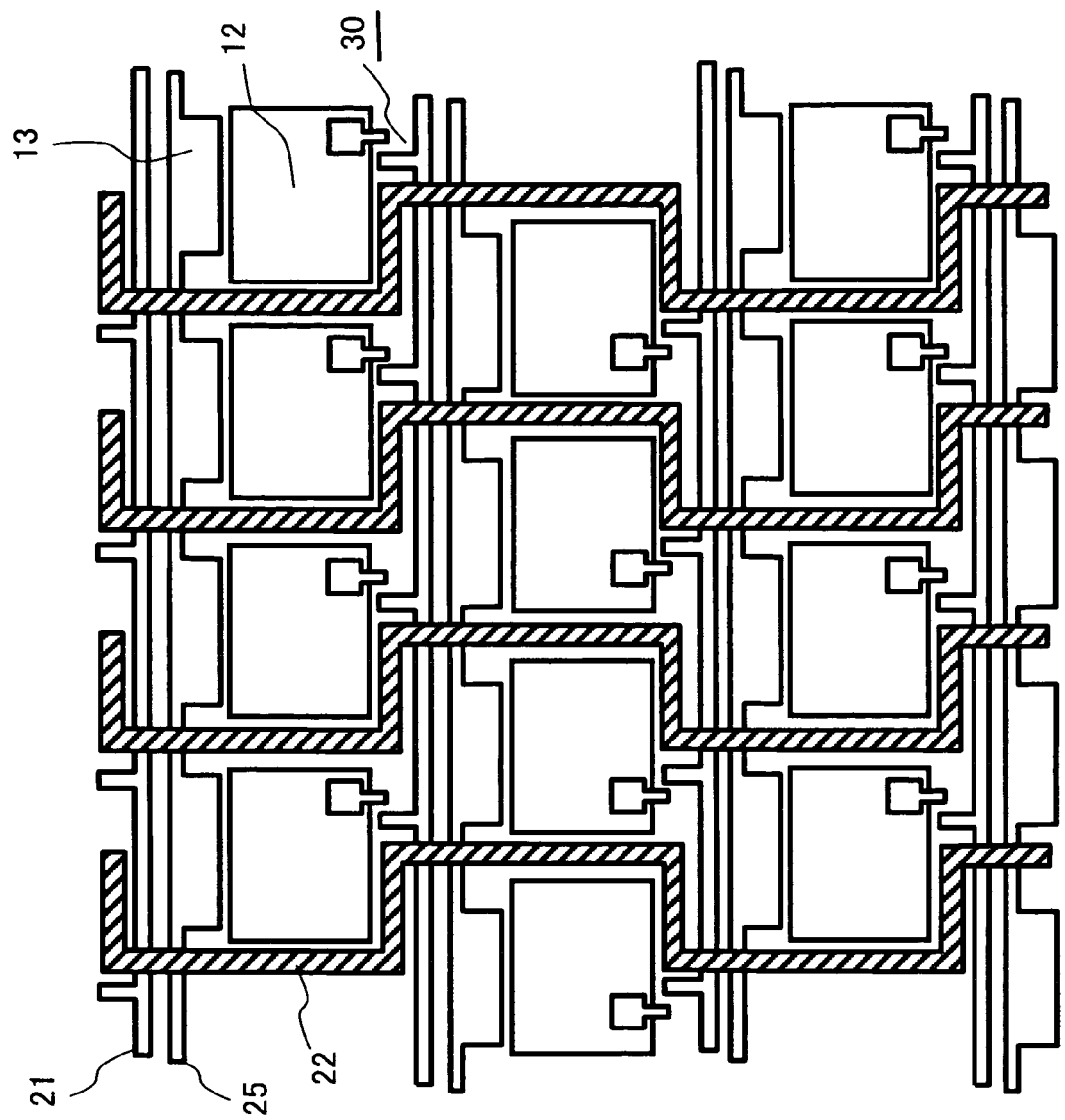
FIG. 19 is a plan view schematically showing the configuration of pixels of a liquid crystal display according to an embodiment of the invention.

FIG. 19 shows a pixel configuration for realizing the delta arrangement. Where color filters are arrayed in the delta arrangement, pixels need to be arrayed also in the delta arrangement. In this case, as shown in FIG. 19, the drain signal lines 22 are winding. Concomitantly, the positions of the gate electrodes are modified. Therefore, to achieve a delta arrangement of color filters, it is necessary that the pixel configuration be redesigned and expensive masks for interconnects be rebuilt.

Figure 20:
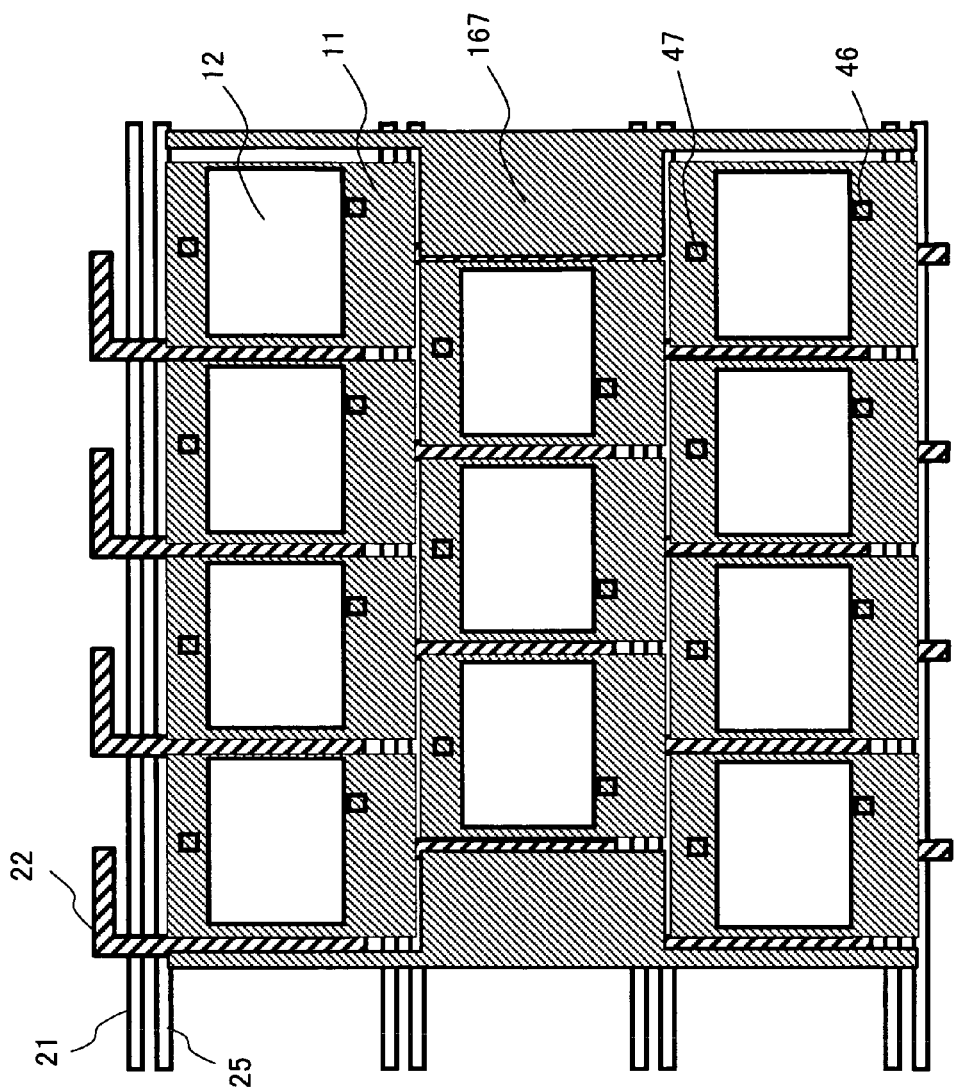
FIG. 20 is a plan view schematically showing the configuration of pixels of a liquid crystal display according to an embodiment of the invention.

FIG. 20 is a plan view showing the positions of reflective regions 11 arrayed in the delta arrangement. In this arrangement, color filters are shifted with respect to each other by a half of a pixel. Therefore, an excessive row of a half of a pixel is produced at each end. Consequently, dummy pixels 167 are formed. The dummy pixels 167 is made of a reflective (optically shielding) film forming the reflective regions 11. Each dummy pixel 167 has no transmissive region 12. A voltage is applied to each dummy pixel 167 such that it is always observed as black.

Figure 21:
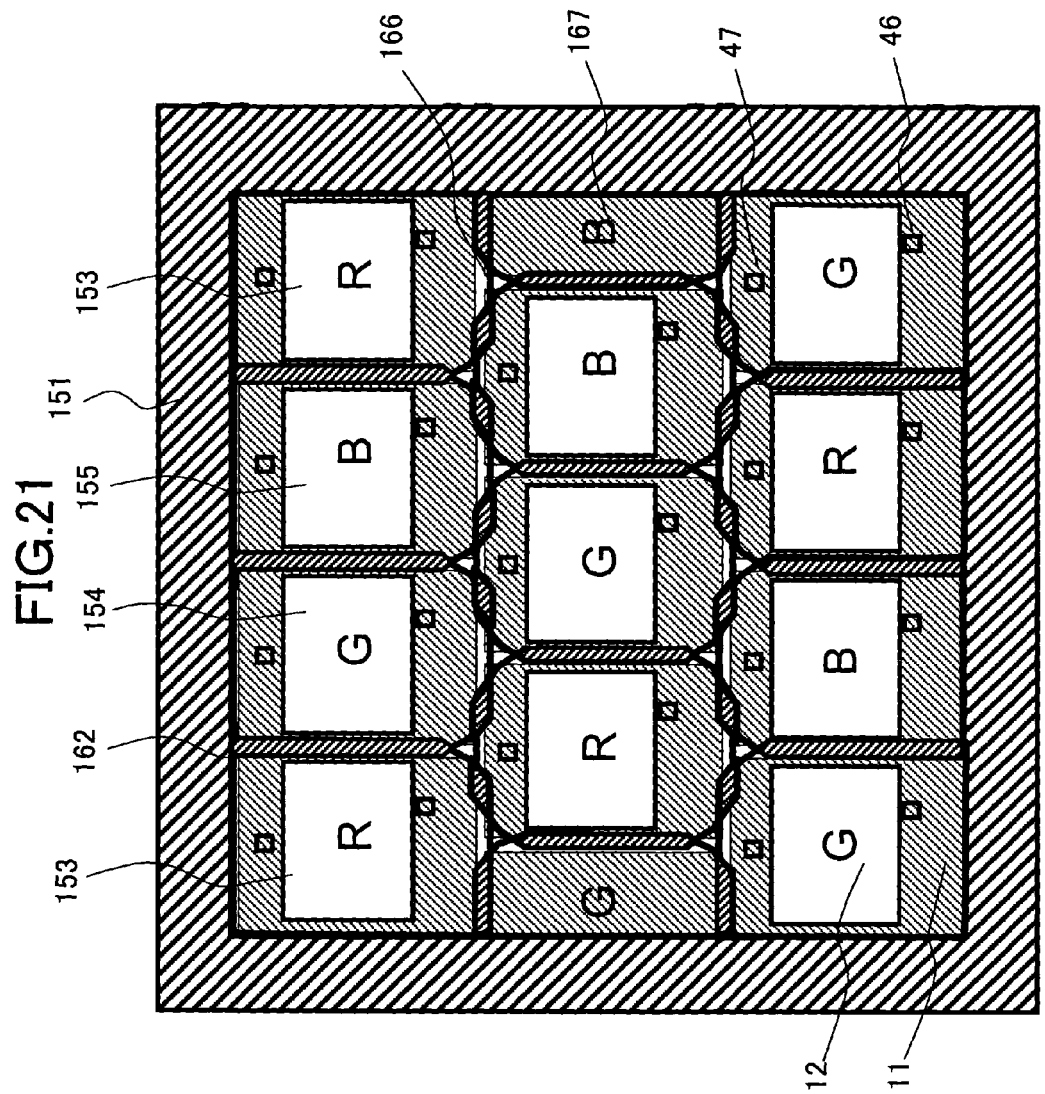
FIG. 21 is a plan view schematically showing the configuration of pixels of a liquid crystal display according to an embodiment of the invention.

FIG. 21 is a plan view showing the manner in which a color filter substrate of the delta arrangement and a TFT substrate are overlapped. End portions of reflective electrodes 11 are hidden by optically shielding portions 162 that are overlaps between color filters. The reflective electrodes 11 and the optically shielding portions 162 that are overlaps between color filters have a function of an optically shielding film. In FIG. 21, the gaps around the corners 161 have bee reduced. As a result, leakage of light is prevented more effectively. With the delta arrangement, however, 6 corners 161 are created around each pixel as noted above. Therefore, gaps 166 tend to be produced at the six corners.

Figure 22:
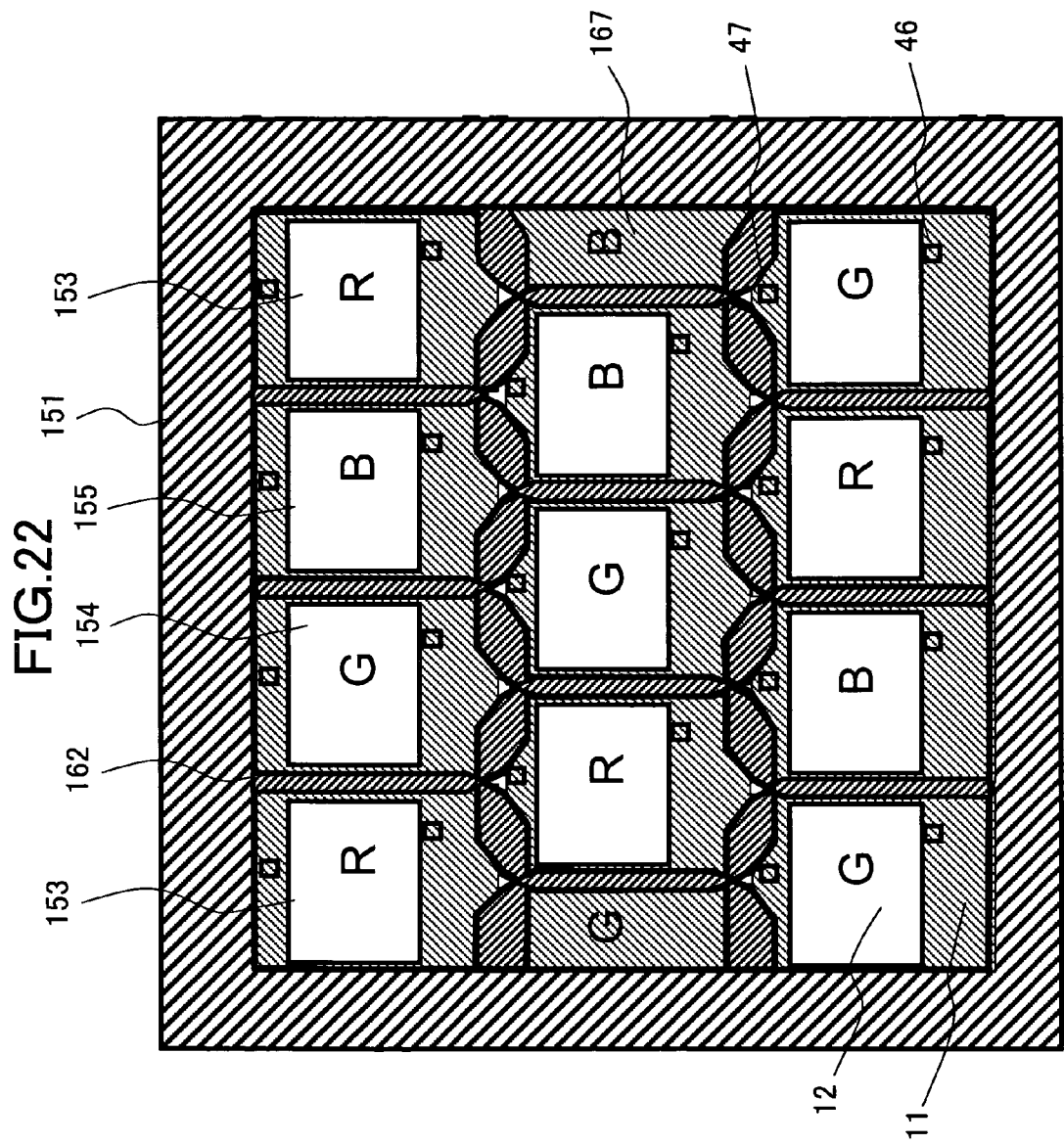
FIG. 22 is a plan view schematically showing the configuration of pixels of a liquid crystal display according to an embodiment of the invention.

FIG. 22 shows color filters arrayed in the delta arrangement, and in which the width of the optically shielding portions 162 that are overlaps between vertically adjacent color filters have been widened. Although the gaps in the corners 161 have been filled up, the area of each reflective region 11 has been reduced. The aperture ratio is reduced.

Figure 23:
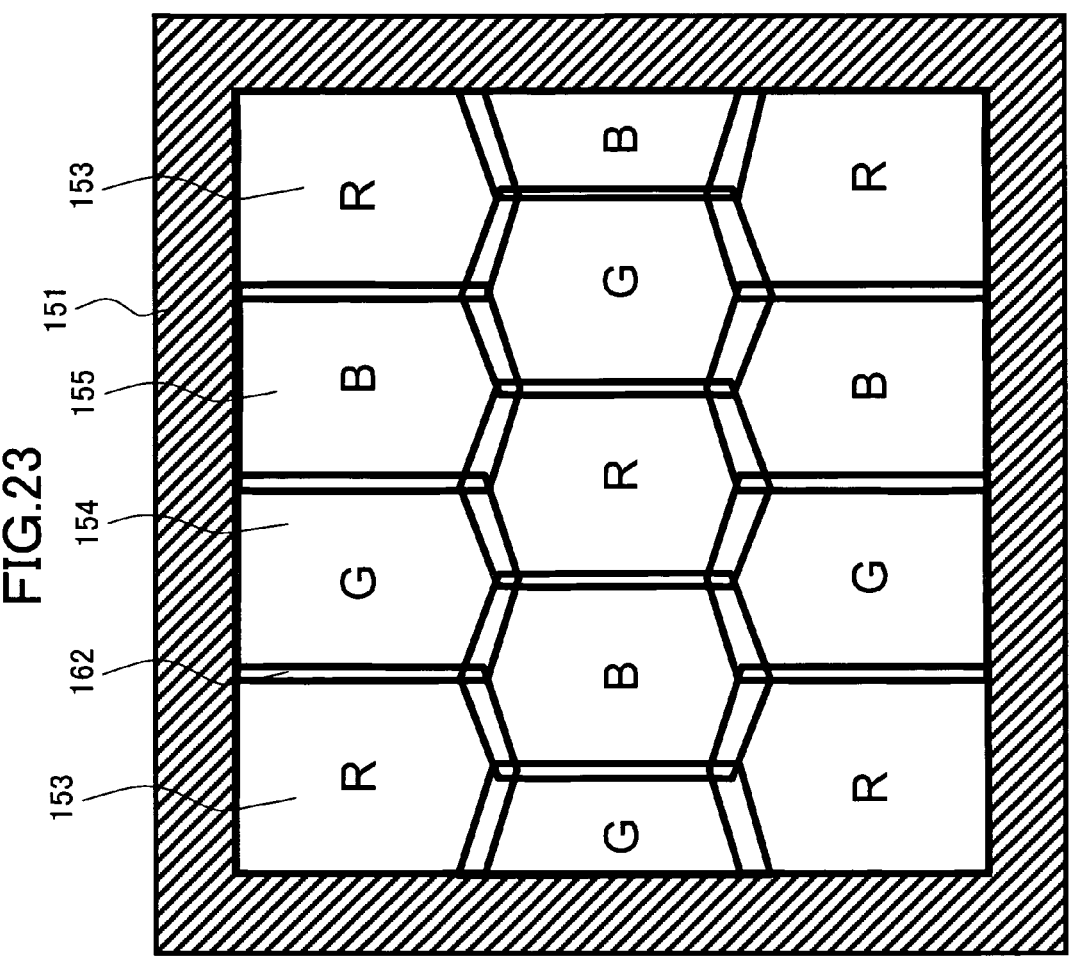
FIG. 23 is a plan view illustrating a process sequence for fabricating the color filter array of a liquid crystal display according to an embodiment of the invention.

FIG. 23 shows color filters shaped hexagonally in conformity with the delta arrangement. In the configuration of FIG. 23, 6 hexagonal corners protrude into the 6 gaps formed around the pixel. Hence, the corners of the hexagons fill the 6 gaps of the delta arrangement.

Where each color filter is shaped into a regular hexagon, the angle of each corner 161 can be set to a wide angle (obtuse angle) of about 120 degrees. Therefore, as compared with a rectangle (including a square) whose each corner has an angle of about 90 degrees, the effect of interference during exposure decreases. The corners are less rounded.

Figure 24:
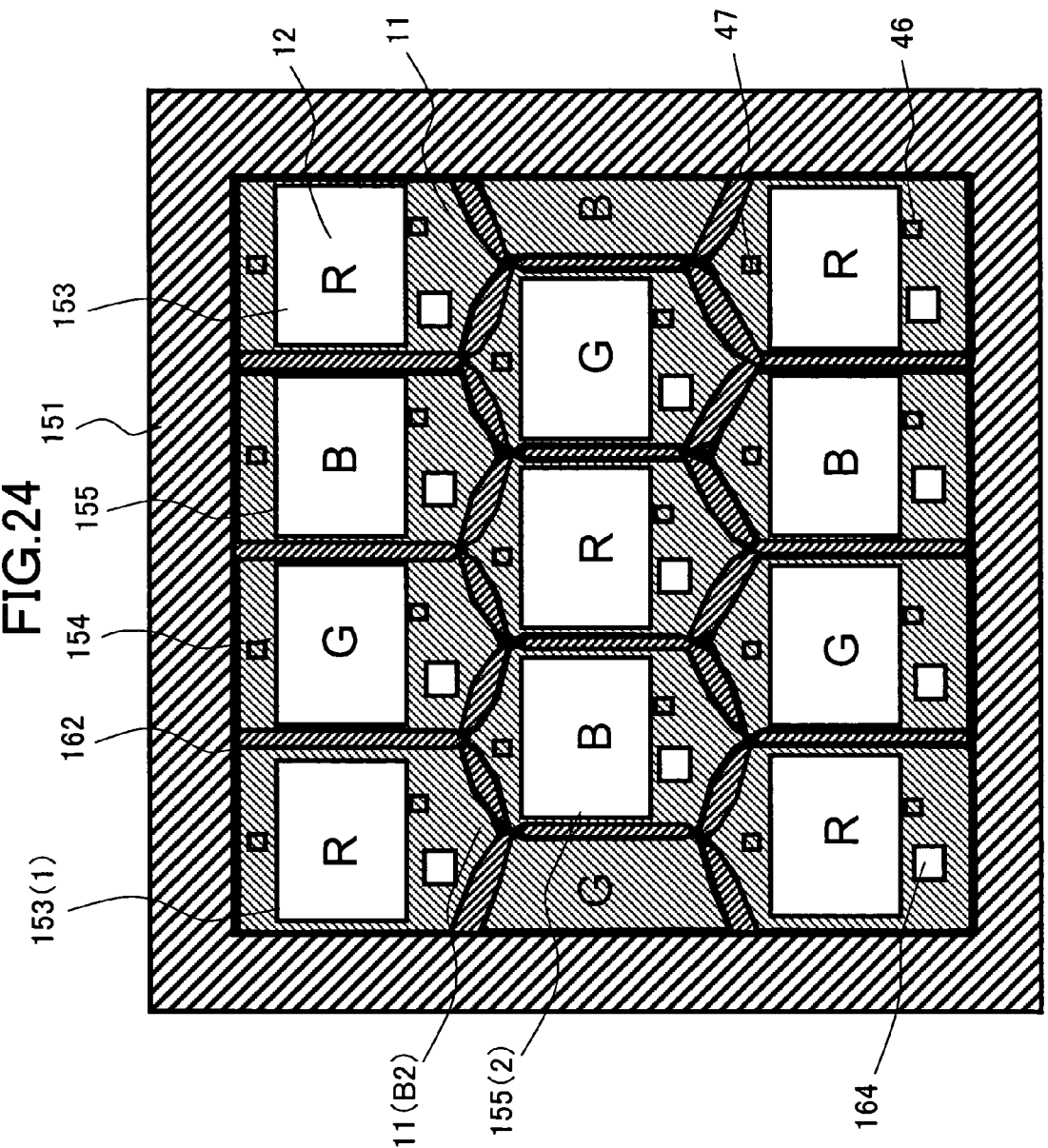
FIG. 24 is a plan view schematically showing the configuration of pixels of a liquid crystal display according to an embodiment of the invention.

FIG. 24 is a plan view of a TFT substrate having pixels of the delta arrangement and a color filter substrate having hexagonally shaped color filters, the color filter substrate being overlapped on the TFT substrate. In FIG. 24, each reflective region 11 is shaped hexagonally in conformity with the color filters. As shown in FIG. 24, the six gaps formed around each pixel are filled up with optically shielding portions 162 that are overlaps between color filters. The area of each reflective region 11 is not reduced. Furthermore, the optically shielding portions 162 that are the overlaps between color filters overlap end portions of the reflective electrodes 11. Consequently, the function of an optically shielding film is performed.

Each color filter is provided with a reflective opening 164. A part of the color filter that is located over each reflective region 11 is removed, whereby the amount of reflected light can be increased. In the configuration of FIG. 24, the area of each reflective region 11 is made sufficiently great. This permits the formation of the reflective opening 164.

In the configuration of FIG. 24, however, an adjacent reflective region 11 is highly likely to be formed under each color filter. For example, where a reflective region 11(B2) corresponding to a blue color filter 155(2) is located on the obliquely rightwardly underside of a color filter 153(1) of red and a part of the reflective region 11 (B2) overlaps the red color filter 153(1), there is the problem that a slight amount of blue is added to red. Therefore, it is necessary to enhance the positional accuracy of overlapping. Especially, in positions where the corners of each color filter are formed, the overlapping area is narrowed. As a result, color mixing tends to be incurred more easily.

Figure 25:
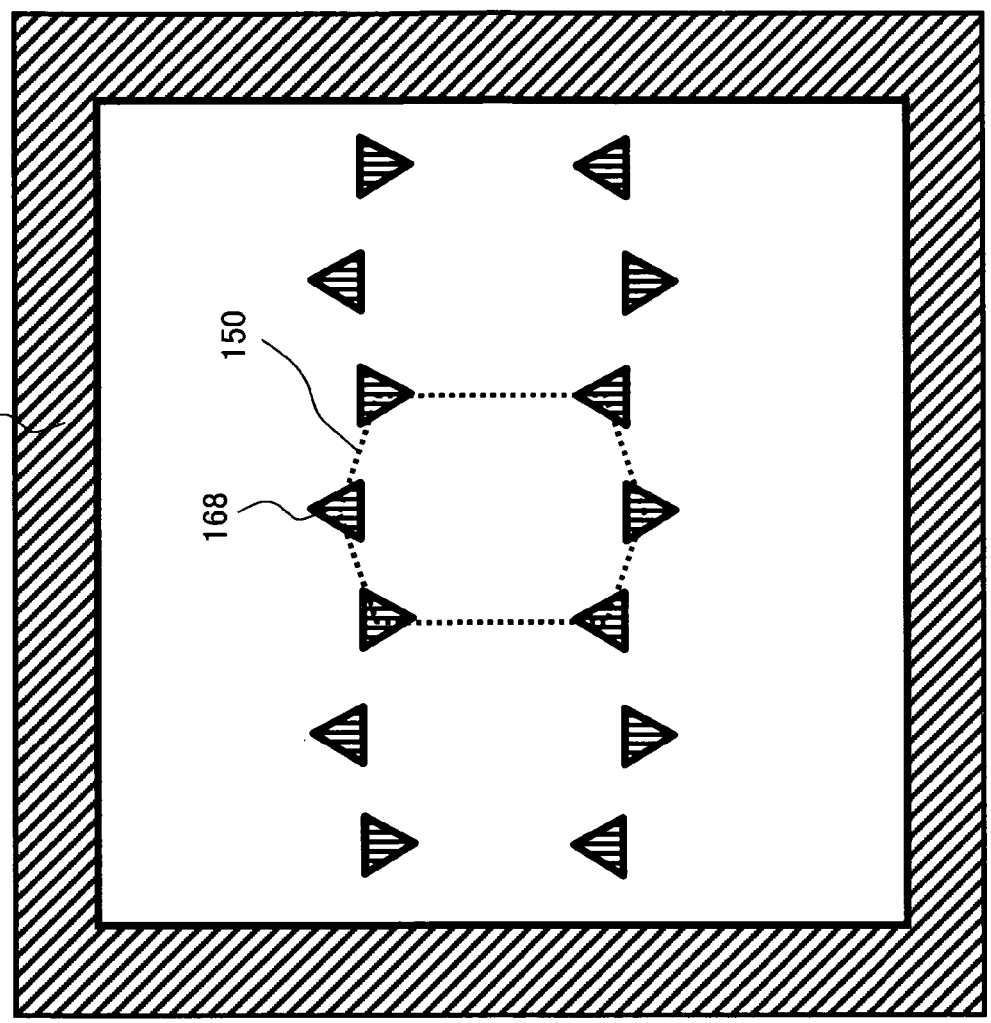
FIG. 25 is a plan view illustrating a process sequence for fabricating the color filter array of a liquid crystal display according to an embodiment of the invention.

Referring to FIG. 25, islands of an optically shielding film 168 are formed at the positions where the corners of color filters arrayed in the delta arrangement are positioned simultaneously with formation of the optically shielding film 151 around the color filters. The islands of the optically shielding film 168 are formed at the six corners of each color filter 150 indicated by the dotted line. In the configuration of FIG. 25, the islands of the optically shielding film are triangular. The triangular islands are alternately inverted up and down.

Figure 26:
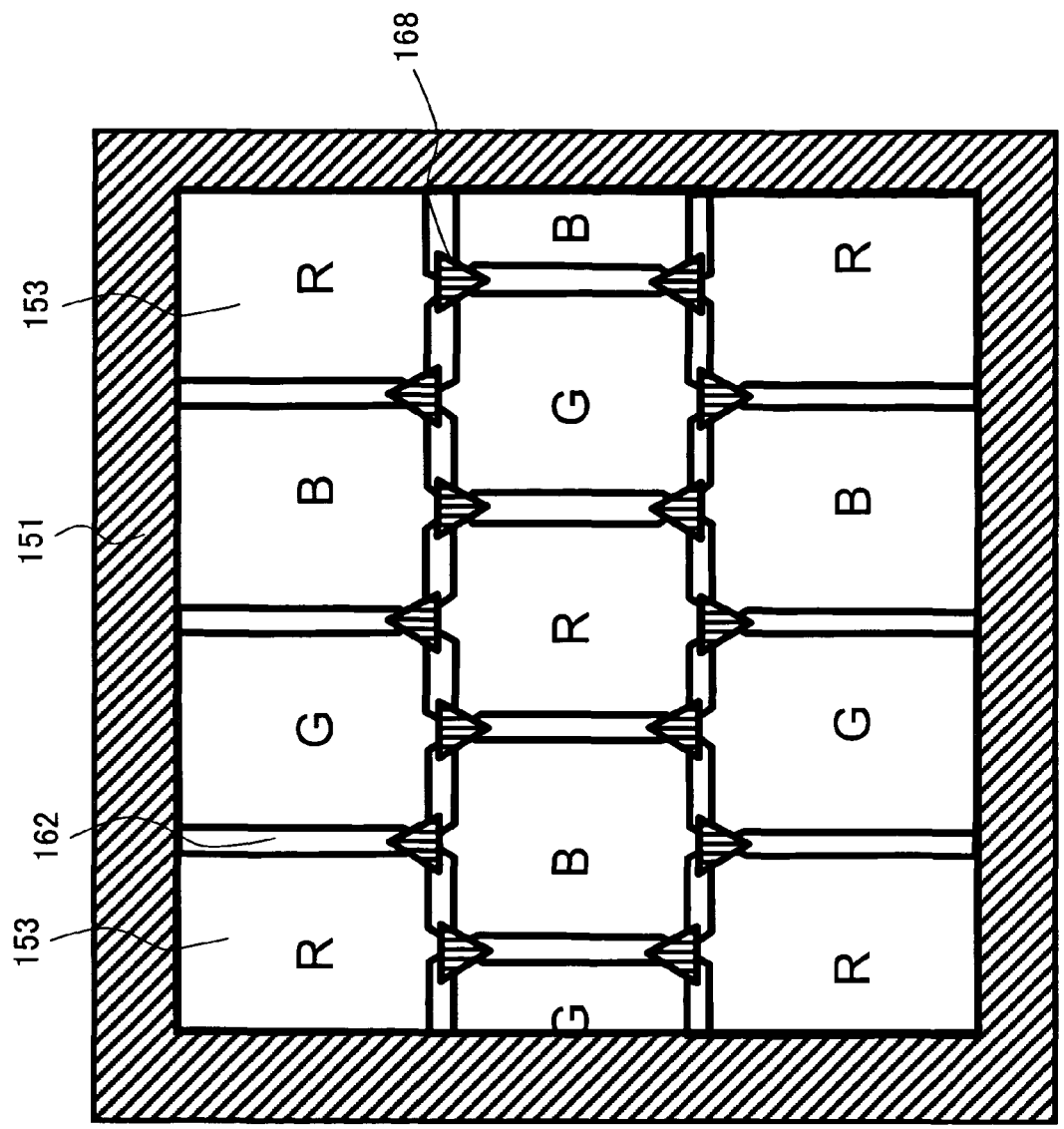
FIG. 26 is a plan view illustrating a process sequence for fabricating the color filter array of a liquid crystal display according to an embodiment of the invention.

FIG. 26 illustrates the positional relationship between each triangular island of optically shielding film 168 and overlapping color films. One of the apices of each triangular island of the film 168 is located in the vertical direction along which the color filters are overlapped. In conformity with the delta arrangement, the triangular islands are alternately inverted up and down.

Figure 27:
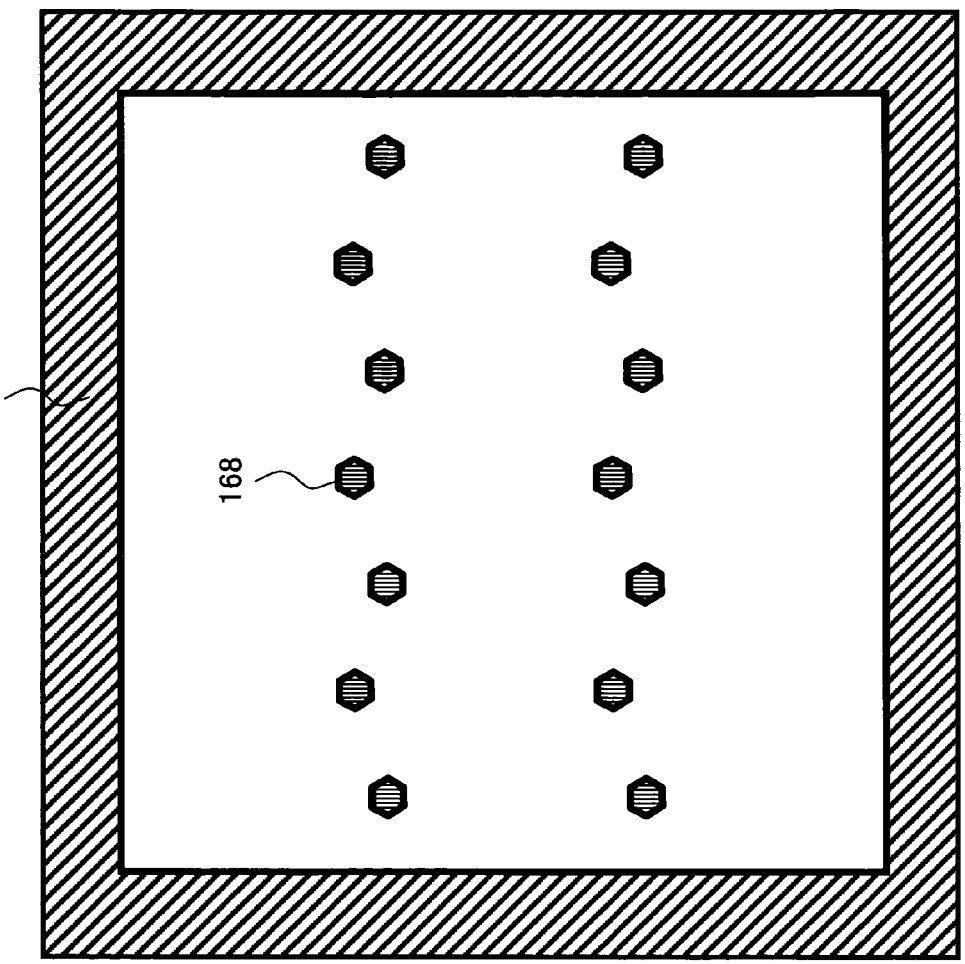
FIG. 27 is a plan view illustrating a process sequence for fabricating the color filter array of a liquid crystal display according to an embodiment of the invention.

Referring to FIG. 27, there are shown hexagonal islands of optically shielding film 168. By hexagonally shaping every island of the optically shielding film 168, it is possible to address the aforementioned problem that the corners are rounded because the amount of exposure is small. Where the islands of the optically shielding film 168 are formed from resin by photolithography, the angle of each corner can be maximized with desirable results by hexagonally shaping each island. The hexagonal islands of the optically shielding film 168 are alternately placed up and down in conformity with the positions of the corners of the delta arrangement.

Figure 28:
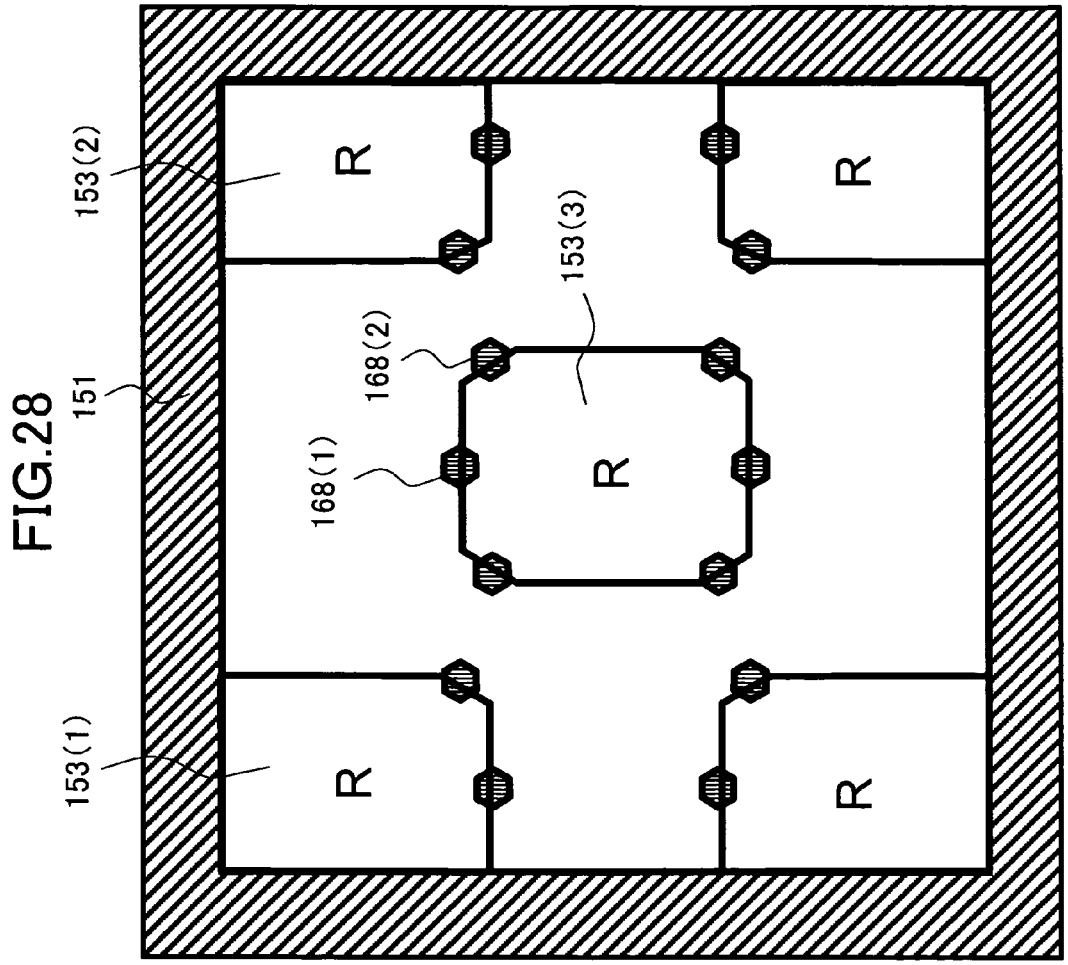
FIG. 28 is a plan view illustrating a process sequence for fabricating the color filter array of a liquid crystal display according to an embodiment of the invention.
Figure 29:
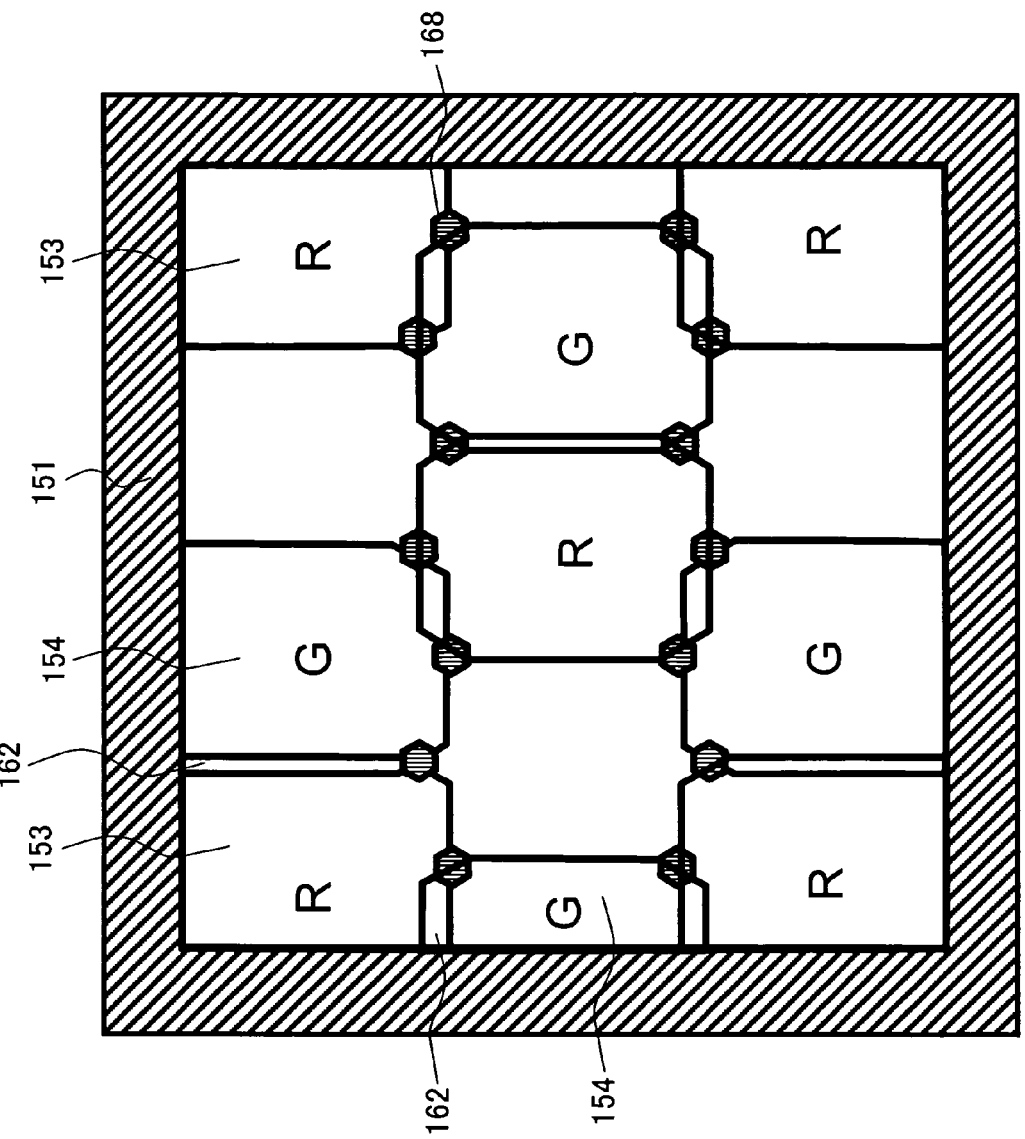
FIG. 29 is a plan view illustrating a process sequence for fabricating the color filter array of a liquid crystal display according to an embodiment of the invention.
Figure 30:
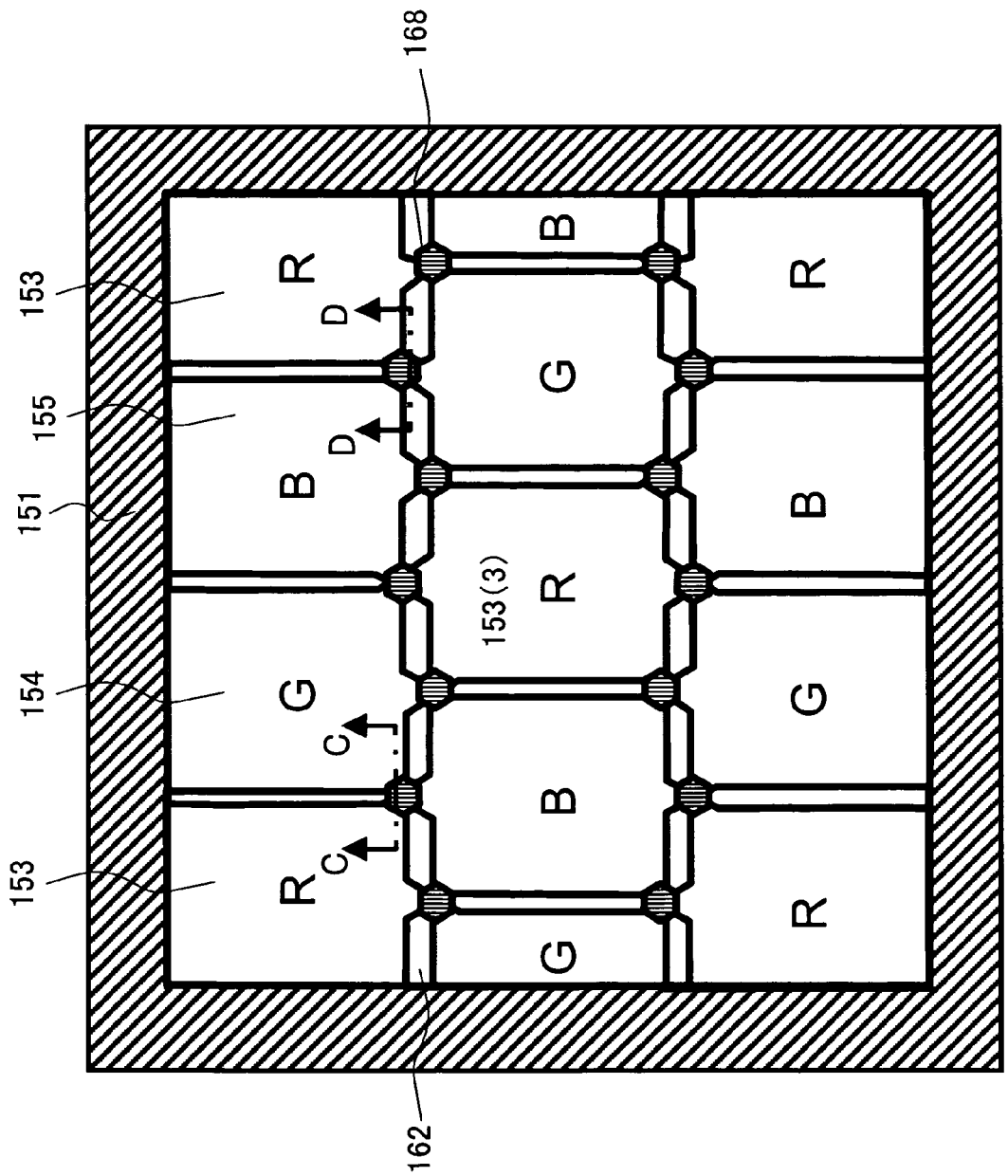
FIG. 30 is a plan view illustrating a process sequence for fabricating the color filter array of a liquid crystal display according to an embodiment of the invention.

FIGS. 28-30 are plan views illustrating a process sequence for forming an optically shielding film by overlapping color filters, using hexagonal islands of optically shielding film 168. In the configuration of FIGS. 28-30, the four corners of each rectangular color filter are rounded such that the rectangle is shaped into an octagon or an ellipse close to an octagon.

FIG. 28 shows the manner in which color filters 153 of a first color are formed in hexagonal islands of the optically shielding film 168. The color filters 153 of the first color partially overlap the hexagonal islands of the optically shielding film 168. The four corners of each color filter 153 are rounded such that the filter is shaped like an octagon. A hexagonal island of the optically shielding film 168(2) is formed in each rounded corner.

The islands of the optically shielding film 168(1) which are not formed in the corners of the color filters 153 are shifted with respect to the islands of the optically shielding film 168(2) formed in the corners so as to approach the vertically adjacent color filters.

With a delta arrangement, color filters are so arranged that each color filter 153 of a first color is surrounded by color filters of the other colors such that color filters of different colors are overlapped. In particular, a color filter 153(3) of the first color is formed in the center of FIG. 28. Color filters 153(1) are formed around the center color filter 153(3) in a spaced relationship therefrom.

Referring next to FIG. 29, a color filter 154 of a second color is formed. An overlap 162 is formed between the color filter 153 of the first color and the color filter 154 of the second color. Because the color filters of the two colors are overlapped, the transmissivity for light is reduced in the visible range of wavelengths.

No color filter is necessary over each dummy pixel 167. To form the overlaps 162, the color filter 154 of the second color is also formed over the dummy pixel 167.

Referring next to FIG. 30, the color filter 155 of a third color is formed. The color filter 155 of the third color forms an overlapped color filter portion 162 with the color filter 153 of the first color and the color filter 154 of the second color. Color filters of two colors are overlapped between the color filter 155 of the third color and a color filter of other color. Consequently, the transmissivity for light is reduced in the visible range of wavelengths.

A hexagonal island of optically shielding film 168 is formed at each corner of each color filter. Thus, the gaps are filled. A color filter 153(3) of red is located in the center of FIG. 30. There are 6 color filters around the red color filter 153(3), and these 6 filters include color filters 154 of green and color filters 155 of blue. Therefore, overlaps 162 can be formed around the color filter 153(3).

FIGS. 28-30 illustrate process sequences for fabricating color filters after forming the islands of optically shielding film 168. After forming the color filters, the islands of optically shielding film 168 may be formed.

Figure 31:
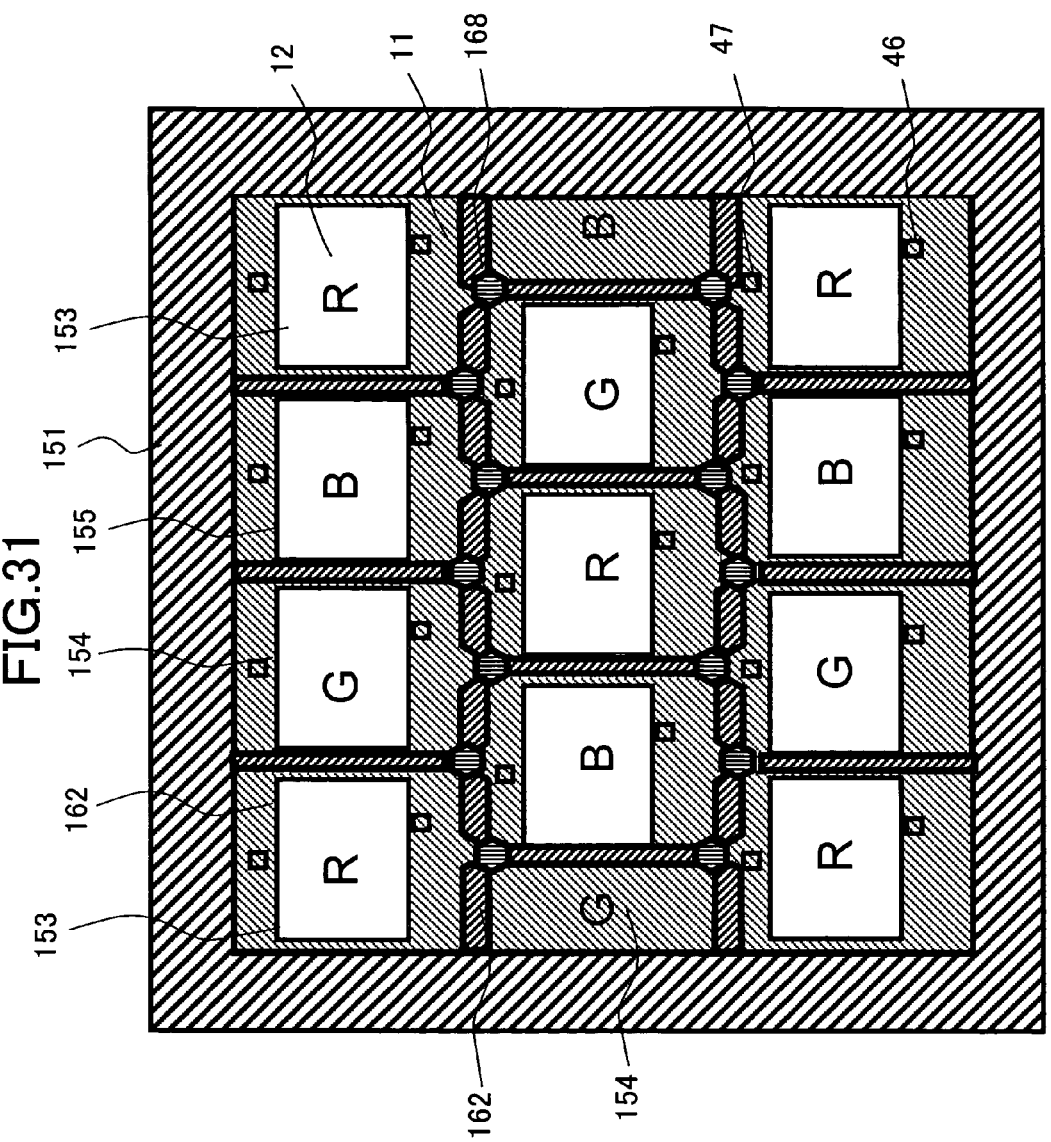
FIG. 31 is a plan view schematically showing the configuration of pixels of a liquid crystal display according to an embodiment of the invention.

FIG. 31 shows the manner in which a TFT substrate and a color filter substrate are overlapped, the color filter substrate having hexagonal islands of optically shielding film 168 thereon. End portions of each reflective region 11 are hidden by overlap portions 162. Any unsuitable pixel reflective region 11 is not disposed under the color filters. In the liquid crystal display shown in FIG. 31, mixing of colors is prevented more effectively. The overlap portions 162, reflective regions 11, and islands of optically reflective film 168 perform the function of an optically shielding film. Decrease in the area of each reflective region 11 is suppressed. The decrease of the aperture ratio is at a permissible level.

A process sequence for forming the islands of optically shielding film 168 after fabrication of color filters is next described by referring to the cross-sectional views of FIGS. 32-A to 32-C. Where the islands of optically shielding film 168 and the substrate 3 are weakly bonded and easily peel off from each other, peeling of the islands of optically shielding film 168 is effectively prevented by forming the islands of optically shielding film 168 over the color filters, because in this way, the color filters are bonded to the shielding film 168 with higher adhesive strength.

Where the islands of optically shielding film 168 are formed after forming the color filters, the color filters are first formed such that a gap is created over the substrate 3 as shown in FIG. 32-A. FIG. 32-A shows the manner in which the gap 166 is formed between color filters 153 and 154. The color filter 155 is similarly formed over the substrate 3. A gap 166 is formed around each color filter.

FIG. 32-B is a cross-sectional view taken on line C-C of FIG. 30 and shows the manner in which an island of optically shielding film 168 is formed in the gap 166 created between the color filters 153 and 154. FIG. 32-C is a cross-sectional view taken on line D-D of FIG. 30 and shows the manner in which an island of optically shielding film 168 is formed in a gap 166 created between the overlap between color filters 153 and 155 and the overlap between color filters 154 and 155.

FIG. 33 is a plan view of hexagonal color filters to which hexagonal islands of optical shielding film 168 are applied. Although the overlaps 162 between the color filters and the hexagonal islands of optical shielding film 168 fill up the gaps, reflective regions 11 of different pixels may be observed under a few color filters.

FIG. 34 is a plan view of hexagonal color filters to which triangular islands of optically shielding film 168 are applied. The overlaps 162 between the color filters and the triangular islands of optically shielding film 168 can fill up the gaps. Less reflective regions 11 of different pixels are observed under some color filters. Consequently, mixing of colors can be prevented more effectively.

Figure 36:
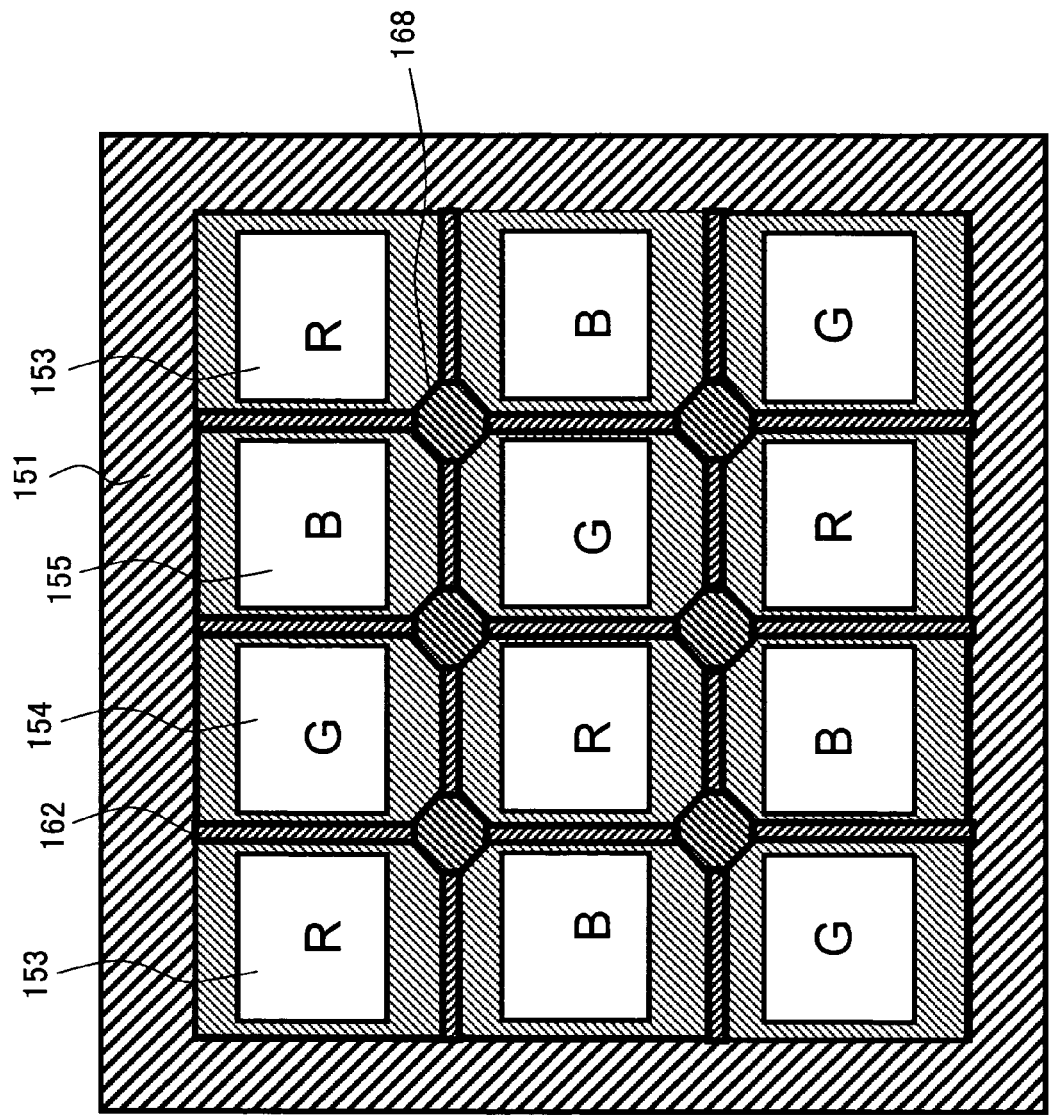
FIG. 36 is a plan view schematically showing the configuration of pixels of a liquid crystal display according to an embodiment of the invention.

FIGS. 35 and 36 show octagonal islands of optically shielding film 168 used in the case of an oblique arrangement. FIG. 35 is a plan view of octagonal islands of optically shielding film 168 fabricated similarly to the optically shielding film 151. The positions of the octagonal islands of optically shielding film 168 are shown. FIG. 36 is a plan view showing the manner in which a TFT substrate and a color filter substrate are overlapped. Less reflective regions 11 of different pixels are observed under the color filters. Mixing of colors can be prevented more effectively. Furthermore, decrease in the area of each reflective region 11 is suppressed. The aperture ratio is reduced only to a permissible level.

As described so far, the present invention makes it possible to provide a liquid crystal display equipped with reflective regions 11 and transmissive regions 12, the liquid crystal display having pixels of a higher aperture ratio. The invention also provides a display device in which the outer periphery of a transmissive region is surrounded by a reflective region and in which the reflective region can be utilized as an optically shielding portion for the transmissive region.

What is claimed is:

1. A liquid crystal display device, comprising:
   a plurality of pixels arranged in a matrix, each of the pixels including a respective reflective region;
   a plurality of color filters including a respective color filter disposed facing to each of the pixels;
   optically shielding portions formed by overlaps of end portions of adjacent ones of the color filters; and
   an island-shaped shielding film formed over an opening between two adjacent optically shielding portions,
   wherein said optically shielding portions include two different color pigments;
   wherein said island-shape shielding film has a shielding portion which does not overlap the color filters, and
   wherein said optically shielding portions have end portions overlapping end portions of the reflective regions.

2. A liquid crystal display device according to claim 1, wherein each of the color filters is made of a resin including a pigment or dye.

3. A liquid crystal display device according to claim 1, wherein said reflective regions comprise metal film.

4. A liquid crystal display device, comprising:
   a plurality of pixels arranged in a matrix, each of the pixels including a transparent electrode and a metal electrode;
   a switching element electrically connected with the transparent electrodes and the metal electrodes of the pixels;
   a plurality of scanning signal lines for supplying a control signal for controlling the switching element;
   a plurality of video signal lines for supplying a video signal to the transparent electrodes and the metal electrodes of the pixels via the switching element;
   a plurality of colored resins located opposite to the metal electrodes and the transparent electrodes of the pixels and having end portions adjacent to each other; and
   an island-shaped shielding film,
   wherein the metal electrode in each of the pixels is formed around the transparent electrode of the pixel,
   wherein said end portions of the plurality of colored resins adjacent to each other overlap each other, forming optically shielding portions that include two different color pigments;
   wherein the island-shaped shielding film is formed over an opening between two adjacent optically shielding portions,
   wherein said island-shaped shielding film has a shielding portion which does not overlap the plurality of colored resins, and
   wherein the optically shielding portions have outer peripheral portions overlapping outer peripheral portions of the metal electrodes.

5. A liquid crystal display device according to claim 4, wherein said plurality of colored resins include a pigment or dye.

6. A liquid crystal display device according to claim 4, wherein the transparent electrodes of the pixels are formed on a surface of said metal electrodes.

7. A liquid crystal display device, comprising:
   a plurality of delta arranged pixels, each of the pixels including a reflective electrode and a transparent electrode;
   a switching element electrically connected with the reflective electrodes and the transparent electrodes of the pixels;
   a plurality of scanning signal lines for supplying a control signal for controlling said switching element;
   a plurality of video signal lines for supplying a video signal to the reflective electrodes and the transparent electrodes of the pixels via said switching element;
   a plurality of color filters disposed in a corresponding manner to said pixels, each of the color filters having hexagons of colored resin; and
   an island-shaped shielding film,
   wherein said reflective electrode in each pixel surrounds an outer periphery of the transparent electrode of the pixel,
   wherein end portions of adjacent ones of the hexagons of colored resin are overlapped to thereby form optically shielding portions which include two different pigments,
   wherein the island-shaped shielding film is formed over an opening between two adjacent optically shielding portions,
   wherein said island-shaped shielding film has a shielding portion which does not overlap the color filters, and
   wherein the optically shielding portions have outer peripheral portions overlapping outer peripheral portions of the reflective electrodes of the pixels.

8. A liquid crystal display device according to claim 7, wherein said colored resin includes a pigment or dye.

9. A liquid crystal display device according to claim 7, wherein the transparent electrodes of each pixel is formed on a surface of said reflective electrode of the pixel.

* * * * *